(12) United States Patent
Radha et al.

(10) Patent No.: US 6,806,909 B1
(45) Date of Patent: Oct. 19, 2004

(54) SEAMLESS SPLICING OF MPEG-2 MULTIMEDIA DATA STREAMS

(75) Inventors: Hayder Radha, Mahwah, NJ (US); Mahesh Balakrishnan, Briarcliff Manor, NY (US); Kavitha Parthasarathy, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/033,730

(22) Filed: Mar. 3, 1998

Related U.S. Application Data

(60) Provisional application No. 60/039,528, filed on Mar. 3, 1997.

(51) Int. Cl.[7] .............................................. H04N 7/12
(52) U.S. Cl. ..................... 348/384.1; 348/515; 348/722; 375/240.28
(58) Field of Search .............................. 348/384.1, 512, 348/722, 584, 515; 370/468, 486, 487, 535, 412, 384; 707/101, 102, 104, 201; 375/240.28

(56) References Cited

U.S. PATENT DOCUMENTS

| | | | | |
|---|---|---|---|---|
| 5,703,877 A | * | 12/1997 | Nuber et al. ............... | 370/395 |
| 5,801,781 A | * | 9/1998 | Hiroshima et al. .......... | 348/441 |
| 5,859,660 A | * | 1/1999 | Perkins et al. .................. | 348/9 |
| 5,917,830 A | * | 6/1999 | Chen et al. .................. | 370/487 |
| 6,067,303 A | * | 5/2000 | Aaker et al. ................. | 370/474 |
| 6,137,834 A | * | 10/2000 | Wine et al. .................. | 375/240 |
| 6,181,383 B1 | * | 1/2001 | Fox et al. .................... | 348/515 |

* cited by examiner

Primary Examiner—Victor R. Kostak
(74) Attorney, Agent, or Firm—Michael E. Belk

(57) ABSTRACT

Respective encoders provide a first and second encoded MPEG-2 data streams for a first and second program respectively. Each stream includes at least video and audio components. The encoder provides seamless video splice-in and splice-out points. A play-to-air splicer is commanded to switch the broadcast output from the first input stream to the second input streams. The splicer identifies approximately aligned seamless video splice-in and seamless video splice-out points in the respective first and second video streams. The splicer splices the second video stream to the first video stream, but continues to broadcast the first audio stream. The splicer identifies corresponding audio splice-in and splice-out points. The splicer splices the second audio component to the first audio component. The splicer adjusts the decode and presentation times in the second stream after the respective slice-in to be consistent with such times in the first program. A decoder converts the compressed video and audio components output from the splicer into uncompressed form.

17 Claims, 12 Drawing Sheets

SEAMLESS SPLICING OF MPEG-2 MULTIMEDIA DATA STREAMS

CROSS REFERENCE TO RELATED APPLICATIONS

This application is a continuation of provisional application No. 60/039,528 filed Mar. 3, 1997.

This invention was made with United States Government support under Cooperative Agreement No. 70NANBH1174 awarded by the National Institute For Standards and Technology (NIST). The United States Government has certain rights in the invention.

FIELD OF THE INVENTION

The invention is related to the field of digital multimedia transmissions and especially to MPEG-2 bit streams.

BACKGROUND

One of the most common operations in TV is switching from one program to another. At the studio, cameras and microphones are switched and mixed to form a program. At the broadcaster (whether broadcast by cable or airwaves), programs are regularly switched to commercials and to other programs. Finally, the viewer is given a choice of several program channels and often switches between the channels, especially between programs.

Currently the switching of analog signals at the studio and at the broadcaster, occurs during vertical intervals. In order to form a picture on a TV screen, first the odd lines of the picture are drawn by an electron gun, from the upper left, across each line, to the lower right side. Then during a vertical interval, the aim of the electron gun is moved from the lower right back to the upper left corner. Then, in a similar manor the electron gun draws the even lines of the picture interlaced with the odd lines. An independent unit of video such as all the even lines (or all the odd lines) is usually referred to as a "frame".

Currently, play-to-air (PTA) switchers are used to switch analog TV signals. Such switchers include synchronizing circuits, so that when a switch command is received, the PTA switcher waits until the next vertical interval between and then switches. When the program is switched during the vertical interval, there are no resulting flickers or flashes or other anomalies in the picture display during switching. This is known as seamless switching.

In a typical implementation of a PTA switcher, there are two output channels: a program channel and a preview channel. The program channel carries the material that is being broadcast ("aired"), whereas the preview channel is used for viewing only within the studio and it usually carries the program to be switched to next (i.e., the next program to be aired and transmitted over the program channel). The focus herein is on the output stream carried over the program channel since this is the stream that is received by the viewers and has to be displayed seamlessly. Therefore, and unless specified differently, output stream refers to the stream output over the program channel.

Many broadcasters are considering adding digital channels to their broadcasts. In the world, colors, brightness, sounds have practically infinite variations. (i.e. they are analog) For digital broadcasting, analog scenes and sounds, usually must be converted into digital representations in a process known as digitalizing or analog-to-digital (A/D) conversion. Due to the high bandwidth required for uncompressed digital video signals, it is expected that the video signals will require compression even in the production studio. For example, a single channel of uncompressed standard definition, digital video requires transmission of about 250 Mbs (million bits per second) of information (high definition video requires 1.5 Gbs). In digital video, pictures may not be interlaced and the term "video frame" is used to refer to a complete picture.

The digital compression/decompression system can be conceived as: multiple encoders, each of which convert an uncompressed digital signal stream to a compressed stream; a switcher or splicer which switches between the input stream from each encoder to an output stream; and a decoder which decompresses the output stream from the splicer.

The standard for handling digital multimedia data is known as MPEG-2. In MPEG-2, the digital representations of elements (e.g. video, 2–4 audio channels, captions) of a program are compressed (encoded) in a lossy manner (i.e. some information is lost) and the encoded information is transmitted as a continuous stream of bits. At the end of transport, the encoded information is decompressed (decoded) to approximately reproduce the original digitalization of the elements, and the decoded elements are displayed to the viewer.

MPEG-2 streams are organized hierarchically. First, the digital representations for each element are encoded (compressed) into a bitstream known as an elementary stream (ES). Then headers are inserted into each ES to form a packetized elementary stream (PES). The header of each PES contain a decode timestamp (DTS) which specifies when the decoding of the following ES is to be completed, and a presentation timestamp (PTS) which specifies when the decoded information for the following ES is to be presented. For example, a PES header will be inserted before each picture of a video elementary stream and before each frame of an audio elementary stream. Each PES stream is encapsulated (packaged) into a series of transport packets each of which are 188 bytes long and include a header and payload such as the bits of a PES stream. A typical PES stream such as a picture, requires a large number of packets. The header of each packet includes flags, a countdown field, and a 13 bit packet identifier (PID) field which identifies the portion of the PES that the packet is for. For example, all the packets for an MPEG group of pictures may have the same PID. All the packets with the same PID are called a PID stream.

There are several auxiliary PID streams for each program, one of the streams is the program clock reference (PCR) which contains samples of a 27 MHz clock used by the video and audio encoders and decoders. The PID that carries the PCR is called the PCR_PID. Another auxiliary PID stream for each program, contains a program map table (PMT) which lists all the PID's which belong to the program and defines which PID streams contain which elements (video, audio channels, captions, PCR_PID). All the PID streams for a program are multiplexed together (the packets are intermixed, but bits of different packets are not intermixed) so that, for example, the packets for pictures and the packets for audio frames are mixed together.

An MPEG-2 bit stream may include multiple programs. For example, the stream in a cable TV system may include hundreds of programs. The packets for different programs are also multiplexed together so that the decoder has to select the packets of a program in order to decode a particular program. Thus, another auxiliary PID stream is provided containing a program association table (PAT) which lists the PID streams containing the PMT's for each of the programs. The packets of the PAT stream are all identified by a PID=0.

The packets for each program in a multi-program stream may be referred to as a stream or sub-stream. Similarly, the packets for each element or component of a program may be referred to as a stream or substream. Those skilled in the art are accustomed to this terminology.

FIG. 1 schematically illustrates a stream of packets with a packet identifier in the header and video, audio, PCR or PMT data in the payloads. Each packet is actually a continuous stream of bits representing one formatted block as shown. The packets containing data for a first video picture V1 are mixed with packets containing data for a first audio frame A1 and packets containing data for a second audio frame A2 as well as with packets containing PCR times and packets containing PMT information. Note that packets for different video frames in the same program are not mixed and packets for different audio frames in the same program are not mixed. However, for multi-program streams, the packets for a picture of one program would be mixed with packets for pictures of another program. Also, note that the bits of different packets are not mixed, that is, the stream transmits all the bits for one packet sequentially together then all the bits for the next packet sequentially together.

FIG. 2 schematically illustrates the same streams as FIG. 1 in a different way, by showing a separate bar for each component (element) of the program with vertical lines between PES streams for each picture or audio frame. The separate packets are not shown. In FIG. 2, the intermixing of packets for audio frames 1 and 2 with video picture 1 is illustrated by overlapping the PES stream for picture 1 with the PES streams for audio frames 1 and 2.

In the MPEG-2 standard, switching between programs is referred to as splicing, and points where splicing may take place without causing anomalies are referred to as seamless splice points. In MPEG-2, a new program is spliced onto an old program in the output stream when you switch from an old program to a new program. In the header of the packet in the same PES stream most immediately before a splice point, the MPEG-2 standard specifies that the splice point may be indicated, by setting the splicing_point_flag=1, setting the splice_coutdown=0, and if the splice is a seamless splice point, that may also be indicated by setting the seamless_splice_flag=1.

In MPEG-2 video compression, each picture is first compressed in a manner similar to JPEG (quantized cosine intraframe compression), and then sequentially presented pictures are compressed together (quantized cosine interframe compression). Essentially in interframe compression, only the differences between a picture and pictures it depends on are included in the compressed frame. The decoding of a picture may depend on the decoding of previously viewed pictures and in some cases on the decoding of subsequently viewed pictures. In order to minimize decoding problems, especially errors that may be propagate from an erroneous decoding of one picture to cause the erroneous decoding of dependent pictures, only a relatively small group of pictures (GOP) are compressed together (e.g. 9 pictures). The pictures of each GOP are encoded together independently from the pictures of any preceding GOPs and can thus be independently decoded (except for trailing B-frames) and any errors can not propagate from group to group. The first picture in a GOP (in order of presentation) is known as an I-frame and it is essentially just a JPEG encoded (independently compressed) picture and its decoding can be preformed independently (i.e. its decoding does not depend on any other picture). Some of the subsequent pictures in the group may be so called P-frames (prediction encoded frames) and their decoding depends on the previous I-frame and any previous P-frames in the GOP. That is, each P-frame only contains the differences between that picture and the previously decoded I or P-frame and the differences are compressed. Typically in broadcast streams, most of the pictures in a GOP are so called B-frames (bidirectionally encoded frames) and their decoding depends on both the immediately preceding I or P-frame and the immediately succeeding I or P-frame (in order of presentation). B-frames are typically, much smaller than P-frames which are typically, much smaller than I-frames. The size of particular encoded frames in MPEG-2 varies depending on the complexity of the picture and on the amount of difference between the picture and the picture or pictures on which its decoding depends.

A typical scheme proposed for broadcasting MPEG-2 is a group of 9 pictures presented sequentially on a display in the following order:

| $I_1$ | $B_2$ | $B_3$ | $P_4$ | $B_5$ | $B_6$ | $P_7$ | $B_8$ | $B_9$ |
|---|---|---|---|---|---|---|---|---|

The decoding of $P_4$ depends on $I_1$ and the decoding of $P_7$ depends on the decoding of $P_4$ (which depends on the decoding of $I_1$). The decoding of $B_2$ and $B_3$ depends on the decoding of $I_1$ and $P_4$. The decoding of $B_5$ and $B_6$ depends on the decoding of $P_4$ and $P_7$. The decoding of the last two B-frames ($B_8$ and $B_9$) depends on the decoding of $P_7$ and on the immediately following I-frame ($I_{10}$) in the following GOP (not shown).

In the data stream the encoded pictures are not transmitted or stored in presentation order. They are provided in the order that they are required for decoding. That is, the B-frames follow the I and P-frames on which they are dependent. The pictures in this typical scheme are provided in stream order, as follows:

| $I_1$ | $B_{-2}$ | $B_{-1}$ | $P_4$ | $B_2$ | $B_3$ | $P_7$ | $B_5$ | $B_6$ | $I_{10}$ | $B_8$ | $B_9$ |
|---|---|---|---|---|---|---|---|---|---|---|---|

Note that in stream order $B_{-2}$ and $B_{-1}$ of the preceding GOP and $I_{10}$ of the succeeding GOP are mixed with the pictures of this typical GOP.

MPEG-2 defines a video buffer model for a decoder called the video buffering verifier (VBV). The VBV is a bitstream constraint, not a decoder specification. The actual decoder buffer will be designed so that any bitstream that does not overflow or underflow the VBV model, will not overflow or underflow the actual decoder buffer. The VBV model is a first-in-first-out (FIFO) buffer in which bits simultaneously exit the buffer in chunks of one picture at a time at regular intervals (e.g. every 33 milliseconds(ms)). The rate at which pictures exit the buffer is called the frame rate and the average decode time and it is the same as the frame rate.

When a decoder resets and starts to decode a new stream, the VBV buffer is initially empty. The VBV buffer is filled at a rate specified in the bit stream for either: a predetermined period of time for constant bit rate (CBR) mode; or until filled to a predetermined level for variable bit rate (VBR) mode. The time required to partially fill the VBV buffer prior to operation is called the startup delay. The startup delay must be carefully adhered to in order to prevent overflow or underflow of the VBV buffer during subsequent decoder operation.

When a bit stream terminates, the buffer continues to deliver pictures to the decoder until the buffer is emptied. The time required to empty the buffer after the stream ends is called the ending delay.

Those skilled in the art are directed to the following publications: (1) Table 3 "Compression Format Constraints" of Annex A of Doc. A/53, ATSC Digital Television Standard; (2) ISO/IEC 13818-1, "Generic Coding of Moving Pictures and Associated Audio: Systems"; (3) Section 5.13 titled "Concatenated Sequences" in Doc. A/54, "Guide to the use of the ATSC Digital Television Standard", 4th Oct. 1995; (4) ISO/IEC 11172-3 International Standard, "Information Technology-Coding of Moving Pictures and Associated Audio for Digital Storage Media at up to about 1.5 Mbit/s—Part 3: Audio, First edition", 1993-08-01; (5) ISO/IEC 13818-3 "Draft International Standard, Information Technology—Generic Coding of Moving Pictures and Associated Audio: Audio," ISO/IEC JTC1/SC29/WG11 N0703, May 10, 1994; (6) Proposed SMPTE Standard PT 20.02/10 "Splice Points for MPEG-2 Transport Streams," Second Draft, July 1997.

SUMMARY OF THE INVENTION

It is an object of the invention to provide methods and apparatus for carrying out seamless video splicing and to avoid disturbing audio anomalies due to the related audio splicing of MPEG-2 bit streams that include video and audio components.

In the method of the invention for splicing MPEG-2 multimedia programs, in the same or different multimedia data streams, a first and second programs are provided. Each program includes a first media component of the same first media (e.g. video) and a second media component of the same second media (e.g. an audio channel) which is a different media than the first media. Each media component of each program has a multitude of splice-in points with respective begin-presentation times for respective first portions presented after the splice-in. Each media component also has a multitude of splice-out points with respective end-presentation times for a last portion presented before the splice-out. Such times (associated with splice-in and splice-out points) are relative to the starting time of the program. A command is received to splice the second program to the first program. Then the splicer selects a seamless splice-in point for the first component in the second program in the stream and selects a seamless splice-out point for the first component in the first program in the stream. The position of the slice-out point in the stream or streams in the splicer are approximately aligned with the position in the stream of the splice-in point of the first component of the second program. Then the splicer cuts the first component of the first program out at the selected splice-out point for the first component, and splices in the first component of the second program at the selected splice-in point for the first component. Then the presentation times in the second program are changed so that the first presented portion of the first component of the second program has a begin-presentation time which is the same as the end-presentation time of the last presented component of the first program. Then the splicer selects a splice-in point in the stream for the second component in the second program at which (treating the presentation times in the two programs as consistent) the begin-presentation time of the earliest presented portion of the second component of the second program (after the splice-in point for the second component in the stream) is equal or after the end-presentation time of the latest presented portion of the first component (before the splice-out point of the first component of the first program in the stream). The splicer also selects a splice-out point in the stream for the second component of the first program, at which the end-presentation time of the latest presented portion of the second component of the first program (before the splice-out point for the second component in the stream) is equal to or before both: the begin-presentation time of the earliest presented portion of the first component (after the splice-in point of the first component in the stream); and the begin-presentation time of the earliest presented portion of the second component in the second program (after the splice-in point of the second component in the stream). The splicer then splices the second component of the first program out at the selected splice-out point of the second component and splices the second component of the second program in at the selected splice-in point of the second component.

In one specific embodiment of the method of the invention, the begin-presentation time for the earliest presented portion of the second component of the second program (after the selected splice-in point for the second component in the stream) is equal to or after the begin-presentation time for the earliest presented portion of the first component of the second program (after the selected splice-in point of the first component in the stream). Also, the end-presentation time for the latest presented portion of the second component of the first program is equal to or before the begin-presentation time for the earliest presented portion of the second program (following the selected splice-in point for the second component in the stream).

In another specific embodiment of the method of the invention, the end-presentation time for the latest presented portion of the second component of the first program (before the splice-out point for the second component in the stream) is equal to or before the begin-presentation time for the earliest presented portion of the first component of the second program (after the selected splice-in point for the first component in the stream). Also, the begin-presentation time for the earliest presented portion of the second component of the second program (after the splice-in point for the second component in the stream) is equal to or later than the end-presentation time for the earliest presented portion of the second component in the first program (before the splice-out point for the second component in the stream).

In another specific embodiment of the method of the invention, the number of audio frames that must be skipped to prevent overflowing an audio decoding buffer is determined. Then a splice-out point for the second component in the first program that is previous to the splice-in point of the second component in the second program is selected depending on the determination in order to prevent overflowing the audio decoder buffer.

In the MPEG-2 data stream of the invention a first section of the stream consists essentially of a first media component of a first program and a second media component of the first program. A second section of the stream consists essentially of first media component of a second program and a second media component of the second program. A third section of the stream between the first section and the second section, consists essentially of the first media component of the second program and the second media component of the first program.

A multimedia encoder of the invention includes a processing unit; a memory communicating with the processing unit; one or more buffers in the memory; one or more network inputs communicating with the buffers in the memory, for receiving uncompressed programs; and at least one network output communicating with the buffers in the memory, for transmitting a data stream of one or more compressed programs from the encoder. The encoder also includes apparatus for receiving the uncompressed programs from the inputs into the buffers; apparatus for compressing the uncompressed portions of the programs in the buffers into compressed portions of the programs in the buffers; and apparatus for transmitting the compressed programs from the buffers onto the network output. The encoder also includes video splice-out providing apparatus for providing a multitude of seamless splice-out points in at least one of the compressed programs; and video splice-in providing apparatus for providing a multitude of seamless splice-in points in at least another one of the compressed programs. The encoder also has apparatus to prevent audio anomalies due to splicing the compressed programs.

A multimedia data stream splicer of the invention includes: a processing unit; a memory communicating with the processing unit; one or more buffers in the memory; one or more network inputs communicating with the buffers in the memory, for one or more input data streams including at least a first and second programs. Each program includes a first media component of the same first media (e.g. video) and a second media component of the same second media (e.g. audio) which is different than the first media. Each media component of each program has a multitude of splice-in points, each associated with a portion of the component having an earliest begin-presentation time after the splice-in; and a multitude of splice-out points, each associated with a portion of the component having the latest end-presentation time before the splice-out. The splicer further includes at least one network output for an output data stream with one or more programs, communicating with the buffers in the memory. The splicer also includes apparatus (programed computer memory) for receiving the programs from the input data streams into the buffers; apparatus for transmitting the programs from the buffers onto the network output as a data stream; and apparatus for receiving a splice command to splice the second program to the first program. The splicer also includes apparatus for selecting a splice-in point of the first component in the second program depending on the splice command; apparatus for selecting a splice-out point of the first component in the first program, at an equal or previous time with respect to the splice-in point of the first component in the second program; and apparatus for splicing the first component of the first program out at the selected splice-out point of the first component and splicing the first component of the second program in at the selected splice-in point of the first component. The splicer includes apparatus for changing the presentation times in the second program so that the first presented portion of the second program has a begin-presentation time which is the same as the end-presentation time of the last presented portion of the first program. The splicer also includes apparatus for selecting a splice-in point for the second component in the second program, at which the begin-presentation time of the earliest presented portion of the second component of the second program, is equal to or after the end-presentation time of the latest presented portion of the first component of the first program before the splice-out point for the first component. The splicer also includes apparatus for selecting a splice-out point for the second component in the first program, at which the end-presentation time for the latest presented portion of the second component in the first program before the splice-out point for the second component in the stream is equal to or before both: the begin-presentation time for the earliest presented portion of the first component of the second program after the splice-in point of the first component, in the stream; and the begin-presentation time for the earliest presented portion of the second component of the second program after the splice-in point in the stream of the second component. The splicer also includes apparatus for splicing the second component of the first program out at the selected splice-out point of the second component and splicing the second component of the second program in at the selected splice-in point of the second component.

A selective decoder of the invention includes a processing unit; memory communicating with the processing unit, including buffers in the memory; one or more network inputs communicating with the buffers in the memory, for one or more input data streams including at least a first and a second programs. Each data stream includes a first media component of the same first media and a second media component of the same second media which is different than the first media. Each media component of each program has a multitude of splice-in points and splice-out points associated with at least a relative begin-presentation time. The decoder further includes at least one output communicating with the memory, for transmitting uncompressed data of one or more programs from the memory. The decoder also includes apparatus for selecting fewer than all the programs available in the multimedia data stream; apparatus for receiving a selection of fewer than all the programs from the network input, including the first or the second program. The decoder includes apparatus for receiving portions of compressed programs from the input data streams into the decoder; apparatus for decoding portions of compressed data into uncompressed data; and apparatus for transmitting the uncompressed portions of programs from the decoder onto the output as an uncompressed digital data stream. The selective decoder also includes apparatus for receiving a change channel command to splice the second program to the first program; apparatus for selecting a splice-in point of the first component in the second program depending on the change channel command; apparatus for selecting a splice-out point of the first component in the first program, at an equal or previous begin-presentation time with respect to the splice-in point of the first component in the second program; and apparatus for splicing the first component of the first program out at the selected splice-out point of the first component and splicing the first component of the second program in at the selected splice-in point of the first component. The decoder also includes apparatus for selecting a splice-in point for the second component in the second program, at which the begin-presentation time of the earliest presented portion of the second component of the second program, is equal to or after the end-presentation time of the latest presented portion of the first component of the first program before the splice-out point for the first component. The decoder includes apparatus for selecting a splice-out point for the second component in the first program, at which both: the end-presentation time for the latest presented portion of the second component in the first program (before the splice-out point for the second component in the stream) is equal to or before both: the begin-presentation time for the earliest presented portion of the first component of the second program (after the splice-in point of the first component in the stream); and the begin-presentation time for the earliest presented portion of the second component of the second program (after the splice-in point of the second component in the stream). Finally, the decoder includes apparatus for splicing the second component of the first program out at the selected splice-out of the second component and splicing the second component of the second program in at the selected splice-in point of the second component.

Other alternatives and advantages of applicant's inventions will be disclosed or become obvious to those skilled in the art by studying the detailed description below with reference to the following drawings which illustrate the elements of the appended claims of the inventions.

DETAILED DESCRIPTION OF THE PREFERRED EMBODIMENTS

The splicing operation of a PTA switcher must generate an MPEG-2 transport stream that can be decoded, seamlessly, by an MPEG-2 compliant decoder. Seamless switching, or seamless splicing, here means the following:

1. The system target decoder (STD) and video buffer verifier (VBV) buffer models of the decoder must not overflow or underflow before and/or after splicing.

2. Assuming program clock reference (PCR) continuity, the decoding time of the first video access unit (e.g. picture) after splicing must take place at exactly the same decoding time (time relative to PCR, to start decoding) of an access unit of the old stream as if splicing did not occur. In other words, if $DTS\_first\_AU_{new}$ is the decoding time of the first video frame of the new stream (after the splice point), and $DTS\_last\_AU_{old}$ is the decoding time of the last video frame of the old stream (prior to the splice point), then seamless splicing is achieved if:

$$DTS\_first\_AU_{new} = DTS\_last\_AU_{old} + Display\_Period\_last\_AU_{old}$$

where $Display\_Period\_last\_AU_{old}$ is the time needed to display the last video access unit (i.e. picture) of the old video stream (prior to splicing).

The above definition of seamless splicing does not exclude the case when the frame rates of the old and new streams are different. MPEG-2 specifies that if the frame rate changes, then a sequence_end_code must be inserted between the two streams. MPEG-2 does not specify how a decoder should operate when two sequences with different frame rates are present in the receiver buffer of the decoder. However, the ATSC standard specifies that decoders must be able to handle sequence_end_codes seamlessly.

Figure 1:
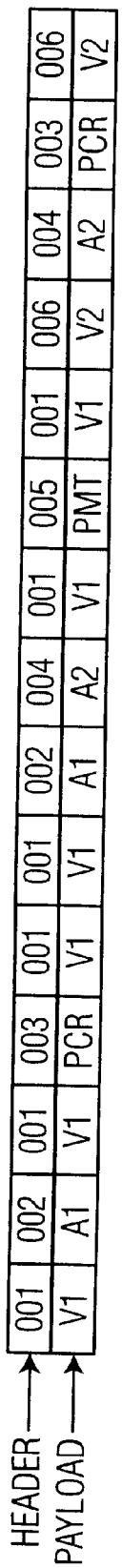
FIG. 1 shows an MPEG-2 stream of packets with the video, audio, and auxiliary packets intermixed.
Figure 2:
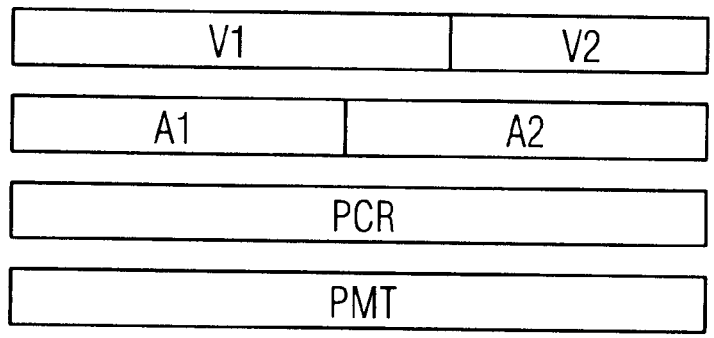
FIG. 2 shows the stream of FIG. 1 with the elements separated to show the overlapping of video pictures and audio frames.
Figure 3:
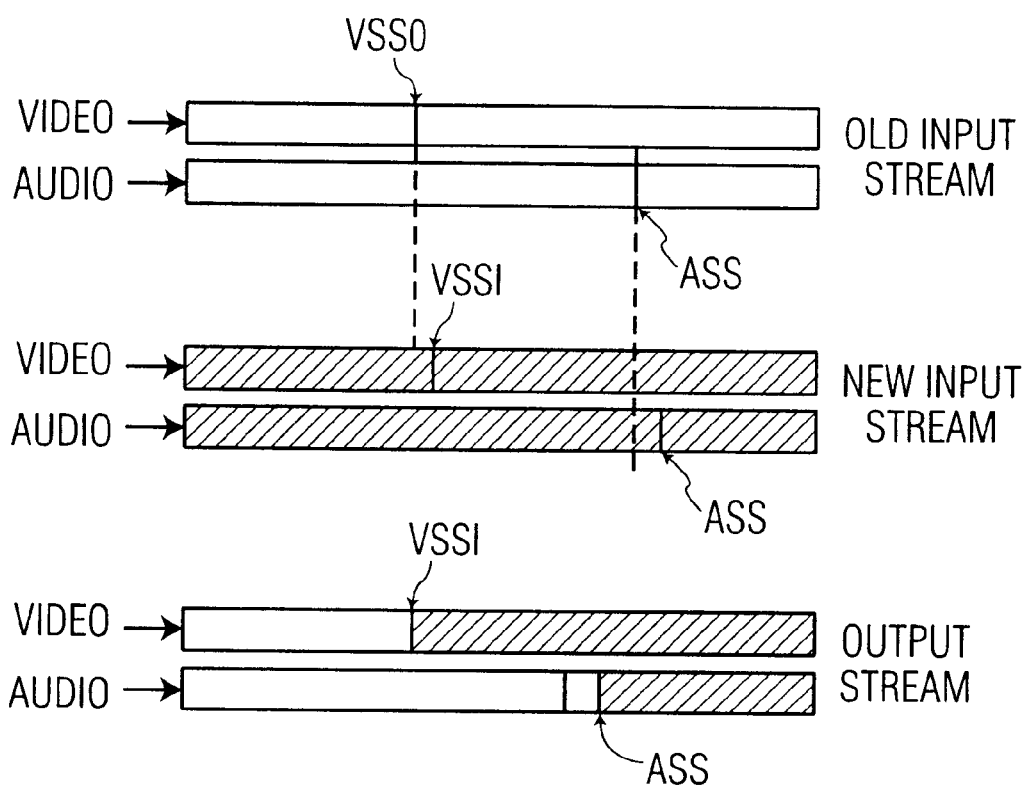
FIG. 3 schematically illustrates the inputs and broadcast output of a digital play-to-air switcher according to the invention.

A digital PTA switcher's input and output streams will be described. In general, a digital PTA switcher must perform splicing among different programs or elementary streams which belong to one or more transport steams. FIG. 3 shows an example of the input and output MPEG-2 streams of a PTA switcher in a digital studio environment.

FIG. 3 shows an example of a PTA switcher's input streams and output broadcast stream. Each of the input streams is illustrated with a single program having a set of video and audio splice points. A splice point is defined as the end of a transport stream packet in which (a) the MPEG-2 flag splicing_point_flag is set, and (b) the MPEG-2 field splice_countdown has a value of zero. It is important to note that the splice points indicate places in the streams where a device, such as the PTA switcher, is allowed to switch from one stream to another. In other words, splice points are not switching commands, but indications of where splicing may occur. However, once a command to splice is received, the existence of a splice point or a seamless splice point with any or with certain splicing parameter values, will trigger a switching operation.

To achieve video seamless splicing (as defined above), a switching device must switch from the old stream at a seamless splice (SS) point and switch into the new stream at a seamless splice-in (SSI) point. An SS point is a splice point in a stream that meets certain constraints, which are described below. Sometimes SS points are referred to herein as seamless splice-out (SSO) points because all SS points may be used for SSO points. In addition to adhering to all of the constraints of a SS point, an SSI point must meet further constraints (explained below). Hereinafter, splice-out and splice-in will be used to refer to seamless splice-out and seamless splice-in points.

Audio splice points are aligned with the beginning and ends of audio frames. In typical audio compression algorithms (e.g. MPEG audio and Dolby AC-3), each audio frame is a self-contained decodable entity. Thus, no further constraints are needed on the audio elementary stream around splice points.

The related audio splice points (in both input streams) occur after the corresponding video splice points in stream order. The audio material is expected to always follow the corresponding video material in MPEG-2 transport streams since the video buffer (and therefore the video decoding delay) is much larger than the audio buffer at the receiver. The amount of data for each picture varies widely as does the time required to decode the pictures. Therefore, and in order to approximately equalize the decoding and display delays between audio and video at the receiver, the audio data is delayed in the stream relative to the video data. Hence, in the invention herein, the switching operation is triggered by a combination of: a switch command (either scheduled in advance or issued in real time), which indicates the time at which switching from one program to another must occur (or indicates switching at the next splice-in point) and the arrival of video splice points in both streams around the desired switching time.

Figure 4:
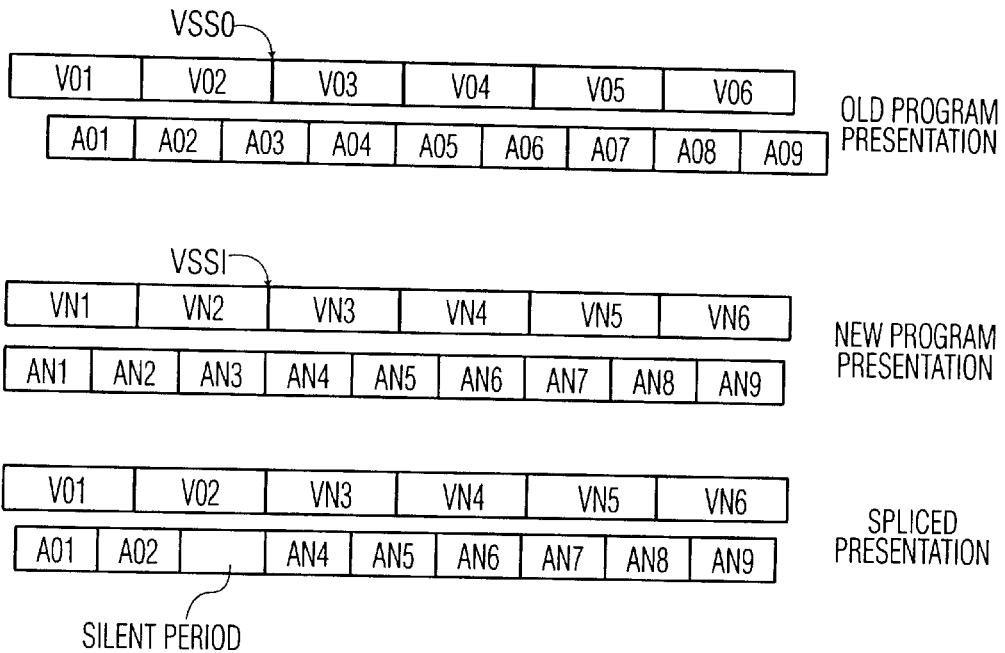
FIGS. 4 and 5 schematically illustrate examples of audio splicing in which audio frames are dropped in accordance with the invention.
Figure 5:
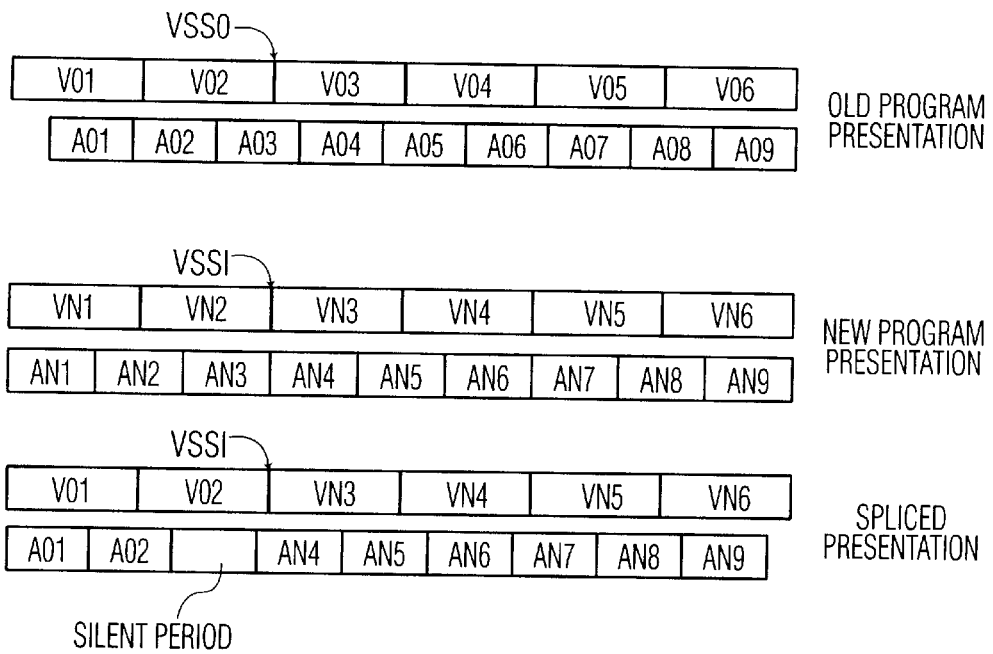

After switching from the video of the old stream to the video of the new stream, the PTA switcher will still be outputting audio from the old stream until the corresponding (and/or desired) audio splice point is reached. Therefore, for a short period of time (on the order of tens to hundreds of milliseconds), the output stream will contain video from the new stream and audio from the old stream. In order to: preserve the relative presentation times between the audio and video frames; achieve seamless splicing of video; and for aesthetic reasons, it might be necessary to drop one or more audio frames from the old and/or new stream. Examples of this are illustrated in FIGS. 4 and 5. Therefore, a parameter provided in the splicing command indicates which audio frame is to be dropped.

FIG. 4 shows an example of audio splicing with video pictures and audio frames in presentation order. The combination of: (a.) seamless splicing of video; and (b.) preserving the relative presentation times of audio and video frames prior to and after a splice point, forces, in general, the creation of a silent period around the desired splice point. In this example, the silent period is created due to the dropping of audio frames $A_{m+2}$ (from the main stream) and $A_{n+2}$ (from the inserted stream).

FIG. 5 shows another example of audio splicing with video pictures and audio frames in presentation order. In this case, the silent period is created due to the dropping of audio frame $A_{m+2}$ only.

The dropping of audio frames can also be achieved through appropriate marking of audio splice points (using MPEG-2 splice flags and fields) which correspond to the desired video splice points. In this case, a switching device (splicer) would switch from an audio splice-out point in the old stream to an audio splice-in point in the new stream.

Marking a splice point for an audio stream which is part of a program multiplexed in an MPEG-2 transport stream, can be done in several ways. It is important, however, that the marking of audio splice points must prevent any overlap in audio presentation times from the old and new streams (see FIGS. 4 and 5). One way of guaranteeing that there is no overlap is to flag the audio splice points as follows:

For an audio splice-out point which corresponds to a video splice-out point: the audio splice-out point should be the end of a TS (time stamp) packet, Last_Audio_TSP, whose last PBS payload byte is the last byte of an audio frame with a PTS value, PTS_Last_Audio. PTS_Last_Audio must satisfy the following relations:

$$\{PTS\_First\_Video - (N_{old} * Audio\_Frame\_Period_{old})\} \leq PTS\_Last\_Audio \leq PTS\_First\_Video - Audio\_Frame\_Period_{old}.$$

Where $N_{old}$ is a positive integer larger than one depending on the audio frames to be dropped, $Audio\_Frame\_Period_{old}$ is the presentation period of an audio frame from the old stream, and PTS_First_Video is the PTS value of the first video access unit after the (corresponding) video splice-out point. The Last_Audio_TSP packet must have the splicing_point_flag set to "1" and splice_countdown field set to "0".

For an audio splice-in point which corresponds to a video splice-in point, the audio splice-in point shall be at the beginning of a TS packet, First_Audio_TSP, whose first PES-payload byte is the first byte of an audio frame with a PTS value, PTS_First_Audio. PTS_First_Audio must satisfy the following relations:

$$\{PTS\_First\_Video + (N_{new} * Audio\_Frame\_Period_{new})\} \geq PTS\_First\_Audio \geq PTS\_First\_Video.$$

Where $N_{new}$ is a positive integer, $Audio\_Frame\_Period_{new}$ is the presentation period of an audio frame from the new stream, and PTS_First_Video is the PTS value of the first video access unit of the corresponding video splice-in point. The First-Audio_TSP packet must have the splicing point flag set to "1" and splice countdown set to "-1". In addition, the audio packet (if any) which precedes the First_Audio_TSP packet in the audio ES must have the splicing_point_flag set to "1" and splice-countdown set to "0".

It is important to note, that while the above constraints on audio splice-out and splice-in points prevent any overlap in audio presentation times, these constraints provide the flexibility of dropping one or more audio frames before and/or after a desired splice program point by controlling the values of $N_{old}$ and $N_{new}$. The above relations also enable "seamless" audio splicing in the case when the audio frames can be presented without any gaps. Seamless audio splicing occurs when the following two equations are satisfied:

$$PTS\_Last\ Audio = PTS\_First\_Video - Audio\_Frame\_Period_{old}.$$

$$PTS\_First\_Audio = PTS\_First\_Video.$$

However, to ensure that an audio gap is created between the two streams, which may be artistically desirable, then these equations must be modified by one of the three following alternatives:

1. To create a gap due to dropping of audio frames(s) from the old stream only, then the following relations must be satisfied:

$$\{PTS\_First\_Video - (N_{old} * Audio\_Frame\_Period_{old})\} \leq PTS\_Last\_Audio < (PTS\_First\_Video - Audio\_Frame\_Period_{old}).$$

$$(PTS\_First\_Video + Audio\_Frame\_Period_{new}) > PTS\_First\_Audio \geq PTS\_First\_Video.$$

In this case, any dropping of audio material from the new stream will occur only if that material is part of an audio frame with a PTS value less than PTS_First_Video.

2. To create a gap due to dropping of audio frame(s) from the new stream only, then the following relations must be satisfied:

$$PTS\_First\_Video - 2*Audio\_Frame\_Period_{old} \leq PTS\_Last\_Audio \leq PTS\_First\_Video - Audio\_Frame\_Period_{old}.$$

$$\{PTS\_First\_Video + (N_{new} * Audio\_Frame\_Period_{new})\} \geq PTS\_First\_Audio > PTS\_First\_Video.$$

In this case, any dropping of audio material from the old stream will occur only if that material is part of an audio frame with a PTS value larger than $\{PTS\_First\_Video - Audio\_Frame\_Period_{old}\}$.

3. To create a gap due to dropping of audio frame(s) from both the new and old streams, then the following relations must be satisfied:

$$\{PTS\_First\_Video - (2*Audio\_Frame\_Period_{old})\} \leq PTS\_Last\_Audio \leq (PTS\_First\_Video - Audio\_Frame\_Period_{old}).$$

$$\{PTS\_First\_Video + (N_{new} * Audio\_Frame\_Period_{new})\} \geq PTS\_First\_Audio > PTS\_First\_Video.$$

In order to restrict the dropping of audio data to a single audio frame, $N_{old}$ must be set to 2, and $N_{new}$ must be set to 1.

For a video splice-in point (which is not a beginning-of-stream point) two audio splice points are needed; an audio splice-out and an audio splice-in point. This is because a video splice-in point can serve as a splice-out or as a splice-in point. In this case, the audio splice-out point will always precede the audio splice-in point (based on the above relations)

Moreover, the above definitions of audio splice-in and splice-out points can be implemented either as constraints on the bitstream (and therefore these points must be marked by the encoder using the appropriate flags as explained above), or they can be implemented by a switching device (splicer). In the latter case, the splicer can use the above relations to determine which audio frames to transmit and drop from the old and new streams. This assumes, however, that the splicer has access to the PTS values of both streams. If these values, which are embedded in the PES header, are not accessible by the splicer (e.g. due to scrambling), they can be made available using the DTS next AU field. In that case, the seamless_splice_flag must be set and DTS_next_AU will represent the PTS value of the next audio frame in the stream.

Figure 6:
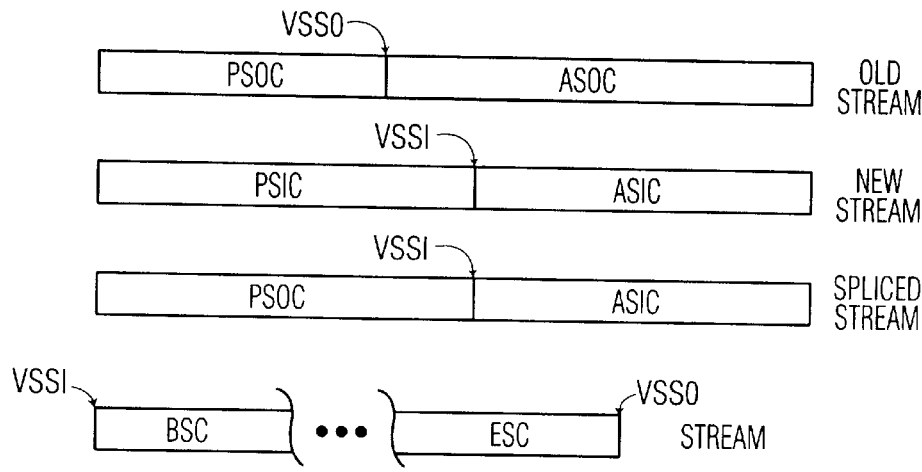
FIG. 6 schematically illustrates the classification of video seamless splicing constraints with respect to splice points.

There are several video splicing constraints and relations between video splicing constraints which must be considered to achieve seamless video splicing. Depending on the location of different constraints (relative to the location of splice points in a video bitstream), several sets of video constraints are defined as shown in FIG. 6. The seamless-splicing constraints that need to be imposed on the bitstream, must be analyzed, and focus must be drawn to a small window of time T around each seamless splice point. If a typical distance between two consecutive splice points in the stream is denoted by SPD (splice-point-distance), then it is assumed that T<<SPD. The following six sets of constraints that are required for seamless splicing, are defined:

1. Prior Splice-Out Constraints (PSOC)

These constraints C(t), are needed in the bitstream prior to a splice-out point.

$$PSOC=\{C(t): t<t_{sso}, t\epsilon T\},$$

where $t_{sso}$ is the time that the seamless-splice-out (SSO) point occurs in the stream.

2. After Splice-Out Constraints (ASOC)

These constraints C(t), are needed in the bitstreams after a splice-out point:

$$ASOC=\{C(t): t>t_{sso}, t\epsilon T\}.$$

It is important to note that although this part of the video stream (i.e. the video material that comes after the splice-out point in the old stream) will not be part of the output switched stream, the ASOC constraints are needed at receivers where the old material will continue playing after the splice-out point. This is applicable, for example, when a broadcaster decides to switch from one sporting event (which might be broadcast nationally) to another sporting event restricted to a certain region of the country, whereas the rest of the country will still receive and view the original sporting event.

3. Prior Splice-In Constraints (PSIC)

These constraints C(t), are needed in the bitstream prior to a splice-in point:

$$PSIC=\{C(t): t<t_{ssi}, t\epsilon T\},$$

where $t_{ssi}$ is the time that the seamless-splice-in (SSI) point occurs in the stream.

These are similar to ASOC's, although this part of the video stream (i.e. the video material that comes before the splice-in point in the old stream) will not be part of the output switched stream, the PSIC constraints are needed at receivers where the new material was viewed prior to the switching operation.

4. After Splice-In Constraints (ASIC)

These constraints C(t) are needed in the bitstream after a splice-in point:

$$ASIC=\{C(t): t>t_{ssi}, t\epsilon T\}.$$

5. Beginning-of-Stream Constraints (BSC)

These constraints C(t) are needed in the beginning of a stream:

$$BSC=\{C(t): t>t_{bs}, t\epsilon T\},$$

where $t_{bs}$ is the time associated with a beginning-of-stream (BS) segment.

6. End-of-Stream Constraints (ESC)

These are constraints which are needed (for seamless splicing) in the end of a stream:

$$ESC=\{C(t): t>t_{es}, t\epsilon T\},$$

where $t_{bs}$ is the time with an End-of-Stream (ES) segment.

Also defined is the set of (seamless) Splice-In Specific Constraints (SISC) which are the constraints that have to be met by seamless splice-in points but not by splice-out points:

$$SISC=\{C: C\epsilon SIC, C!\epsilon SOC\},$$

where SIC and SOC are the sets of all splice-in and splice-out constraints, respectively.

Below, are listed four sets of relationships among the different constraint sets:

1. PSOC and ASOC are mutually exclusive and their union represents all the constraints (SOC—Splice-Out Constraints) needed in a splice-out point:

$$PSOC \cap ASOC = \emptyset$$

$$SOC = PSOC \cup ASOC$$

2. PSIC and ASIC are also mutually exclusive and their union represents all the constraints (SIC—Splice-In Constraints) needed in a splice-in point:

$$PSIC \cap ASIC = \emptyset$$

$$SIC = PSIC \cup ASIC$$

3. SIC is a super-set of SOC:

$$SOC \subset SIC$$

4. All of the seamless Splice-In Specific Constraints (SISC) occur after the splice-in point in the stream. In other words, the SISC constraint set is a subset of the After-Splice-In Constraints (ASIC) set, and SISC intersection with PSIC is null:

$$SOSC \subset ASIC$$

$$SISC \cap PSIC = \emptyset$$

The above relationships leads to the following:

$$PSOC = PSIC = ESC$$

$$ASIC = BSC$$

$$ASIC - SISC = ASOC$$

Therefore, a seamless splice-in point is also a seamless splice-out point but the opposite is not true. This leads to the following three statements:

1. By concatenating a video splice-out point with a video splice-in point, the output stream will contain a video splice-in point as shown in FIG. 3.
2. As illustrated in FIG. 3, a splice-in point is needed in the stream that the PTA switcher must switch into, whereas a splice-out point or a splice-in point is needed in the stream that the switcher is switching from.

3. Detection of a seamless splice-in point can be achieved by:

a. Detecting a splice point in the stream (which is achieved by the detection of normal MPEG-2 splice and/or seamless splice flags and parameters).

b. Detection of Splice-In Specific Constraints (SISC) which occur after the splice-in point as explained above.

FIGS. 7a–7d illustrate the steps of the method of the invention. More specifically, FIGS. 7a–7b include steps 101–110 in which an encoder creates a multimedia data stream with seamless splice-in and splice-out points. In step 101, uncompressed first and second multimedia programs, each with a video component, audio component, and caption component, are provided. The stream may contain hundreds of programs including video only, audio only, data only, and multi-media programs. In step 102, the multimedia programs are encoded using MPEG-2 video compression with each group of pictures ending with a P-frame in presentation order. Thus, the decoding of pictures in a GOP do not depend on any pictures in any other GOP. The audio is compressed using MPEG audio or Dolby AC-3 compression. In step 103, seamless video splice-in points are provided in the packet of the respective video stream immediately before the first packet of each I-frame in the stream. In step 104, the video seamless splice-in points are indicated in the packet of the respective video ES immediately before the first packet of each I-frame. In step 105, seamless video splice-out points are provided immediately before and immediately after each P-frame and each I-frame in the video stream. In step 106, video splice-out points are indicated in the last packet in the respective video ES immediately before each P-frame and I-frame and in the last packet of each P-frame and each I-frame in the video ES. In step 107, seamless audio splice-in points are provided before each audio frame in the audio stream. In step 108, the seamless audio splice-in points are indicated in the last packet of the audio ES immediately before the beginning of each audio frame. In step 109, seamless audio splice-out points are provided after each audio frame in the stream. In step 110, the seamless audio splice-out points are indicated in the last packet of each audio frame in the audio ES.

Figure 7A:
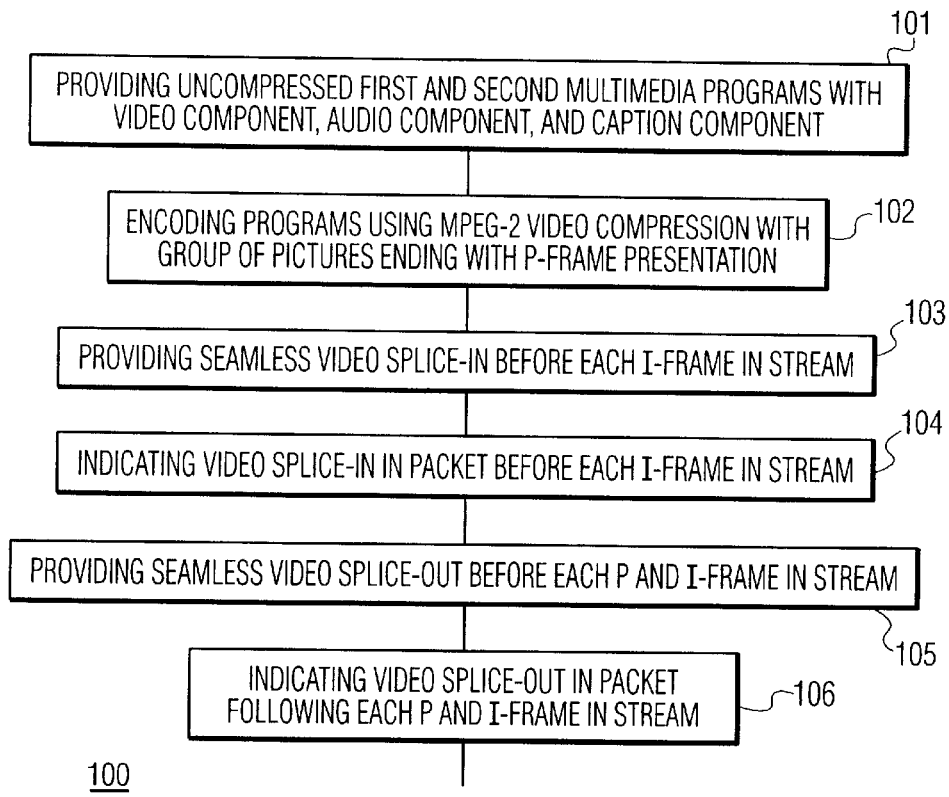
FIG. 7 is a flow diagram of the method of the invention.
Figure 7B:
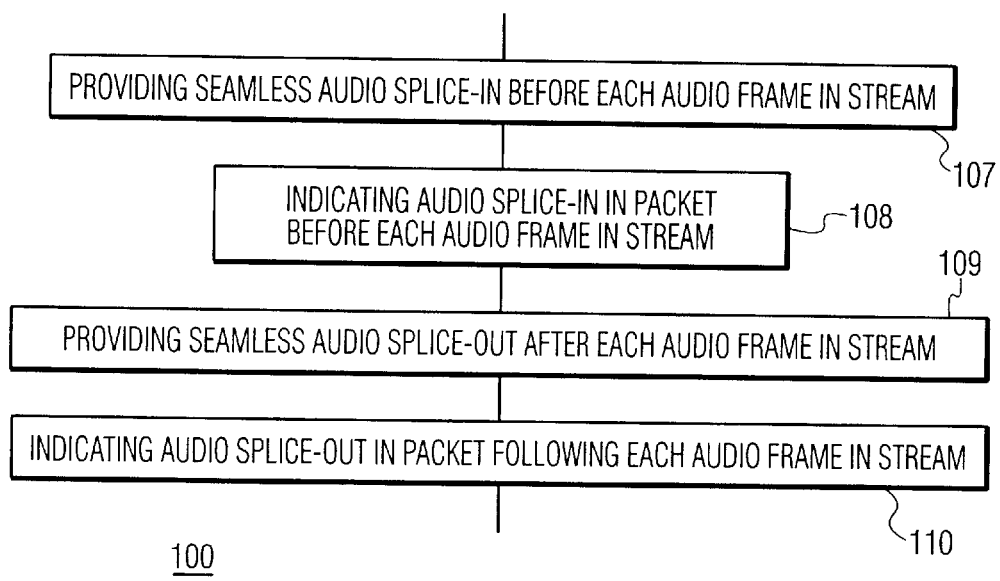
Figure 7C:
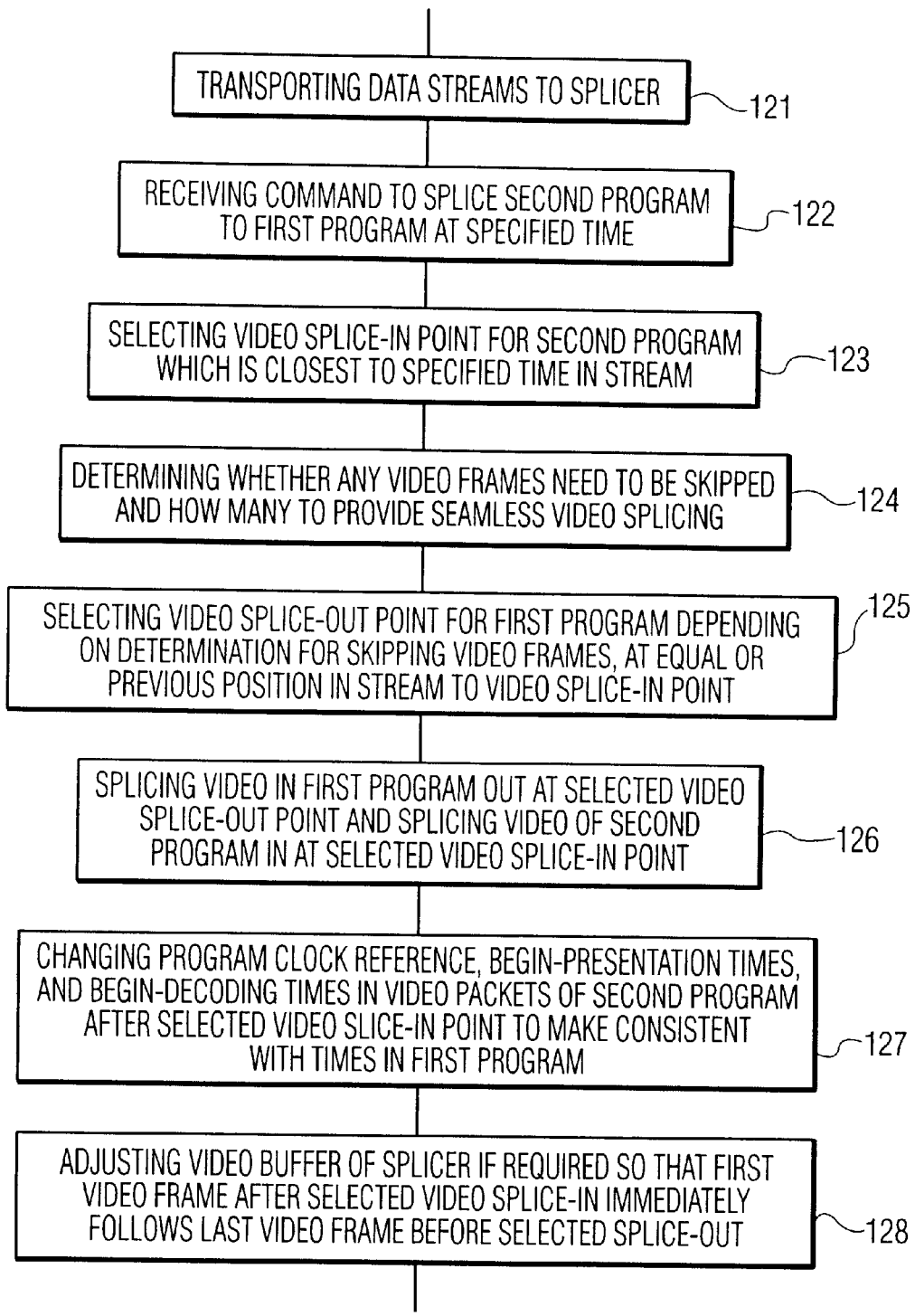
Figure 7D:
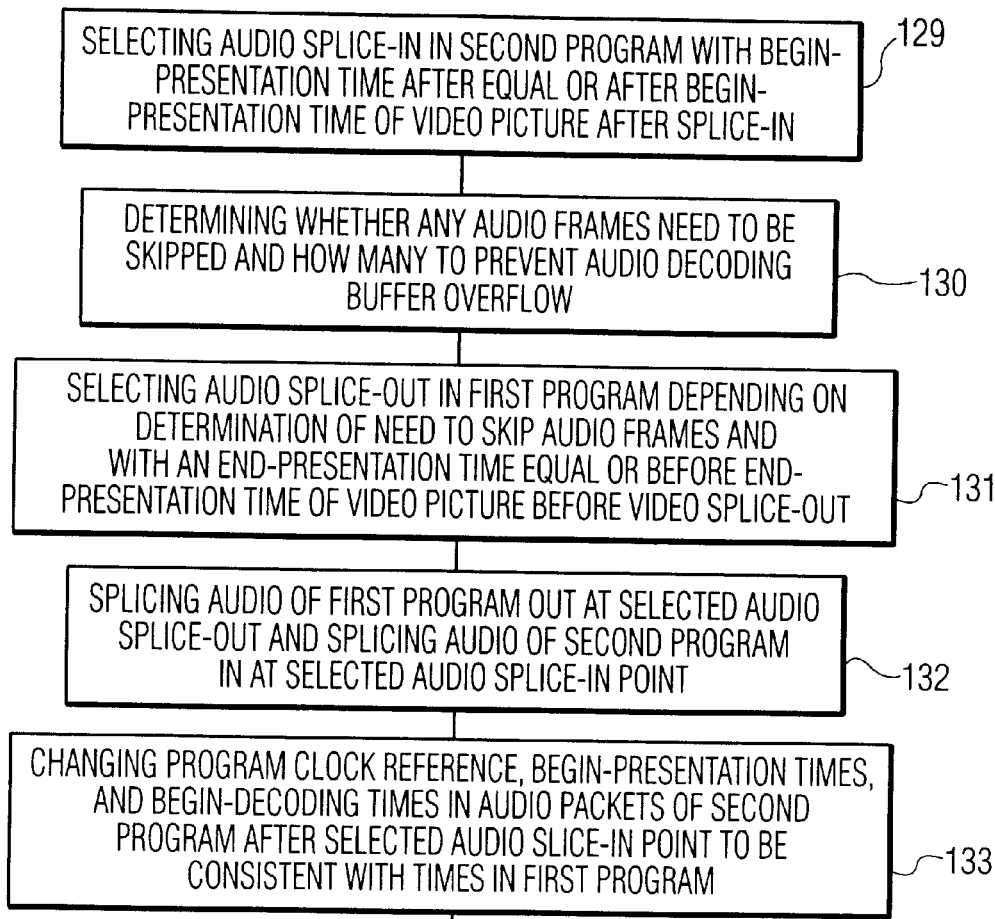

FIGS. 7c–7d illustrate steps 121–133 in which a splicer splices out an old program and splices in a new program in a data stream. This is simply digital switching at the selected splice points. In step 121, a data stream is transported to the splicer. Transportation may include optical, electrical, radio-broadcasting, and/or storage on data media such as optical or magnetic disks or tape. In step 122, a command is received to seamlessly splice the second program to the first program at a specified time. The time may be relative to the program reference clock or to the decoding or presentation time, of either stream, a real time, or immediately so that the next available splice-in is used. A non-seamless splice command could be provided for example at a decoder which substitutes black frames for undecodable frames, for example, for artistic fade to black. In step 123, a video splice-in point is selected for the second program, which is closest to specified time in the stream for splicing. Alternately, the closest slice-out could be selected, and the selection could also be limited to the closest splice either before or after the specified time. In step 124, the splicer determines whether any video frames need to be skipped and how many to skip in order to provide seamless video splicing. The stream may indicate that frames need to be skipped. Preferably, video frames will not need to be skipped if the encoders control the encoding to provide seamless splice-in and seamless splice-out points in the respective streams. In step 125, a video splice-out point is selected for the first program depending on the determination for skipping video frames. The splice-out point is at an approximately aligned position in the stream with respect to the selected video splice-in point. The term "approximately aligned" is limited by the size of any buffer in the splicer and the flexibility of the decoder buffer. In step 126, the video of the first program is spliced out at the selected video splice-out point and the video of the second program is spliced in at the selected video splice-in point. The splicer preferably has a buffer so that a splice-out occurring slightly later in stream order than the splice-in may be selected. In step 127, the program clock reference, begin-presentation times, and begin-decoding times in the packets of second program are changed in the second program after the selected video splice-in point to make them consistent with times in the first program. Alternately, a signal may be inserted to reset the decoder in order to maintain signal presentation. In step 128, the video buffer of the splicer is adjusted if required, so that the first presented video frame after the selected video splice-in point immediately follows the last presented video frame before the selected splice-out point. This step is not required if the video splice-in and video splice-out points are precisely aligned. In step 129, an audio splice-in point in the second program is selected at which a begin-presentation time of the first presented portion after the audio splice-in is equal to or after the end-presentation time of the last presented video picture before the video splice-in in the stream (assuming consistent times of the first and second programs with the end-presentation time of the latest presented picture in the first program before the video splice-out point). In step 130, whether any audio frames need to be skipped and how many to skip in order to prevent audio decoding buffer overflow is determined. Since precise alignment of the streams is difficult to achieve for both video and audio elements, for seamless video splicing, some audio frames usually must be dropped, and vice-versa, for seamless audio splicing usually some video frames must be dropped. In step 131, an audio splice-out in the first program is selected depending on the determination of the need to skip audio frames, which is approximately aligned in the stream with the audio splice-in point, and at which the last presented audio frame in the stream before the splice-out has an end-presentation time equal or before the begin-presentation time of both the video picture after the video splice-in; and the audio frame after the audio splice-in. In step 132, the audio of the first program is spliced out at the selected audio splice-out point and the audio of the second program is spliced in at the selected audio splice-in point. In step 133, the program clock reference, begin-presentation times, and begin-decoding times in the audio packets of the second program after the selected audio splice-in point are changed if required, to be consistent with times in the first program.

Figure 7E:
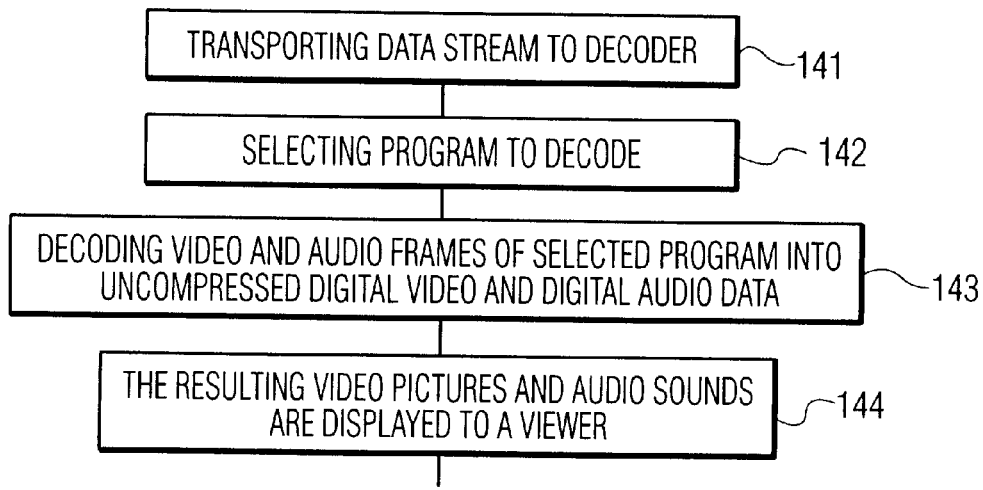

FIG. 7e includes steps 141–143 in which the spliced data stream is decoded. In step 141, the data stream is transported to the decoder. In step 142, the program to be decoded is selected. In step 143, the video and audio frames of the selected program are decoded into uncompressed digital video and digital audio data. In step 144 the resulting pictures and sounds are displayed to a viewer. Steps 121–133 of FIGS. 7c–7d may be repeated in the decoder in order to seamlessly switch programs (change channels) when a multi-program stream is received by a decoder.

Figure 8:
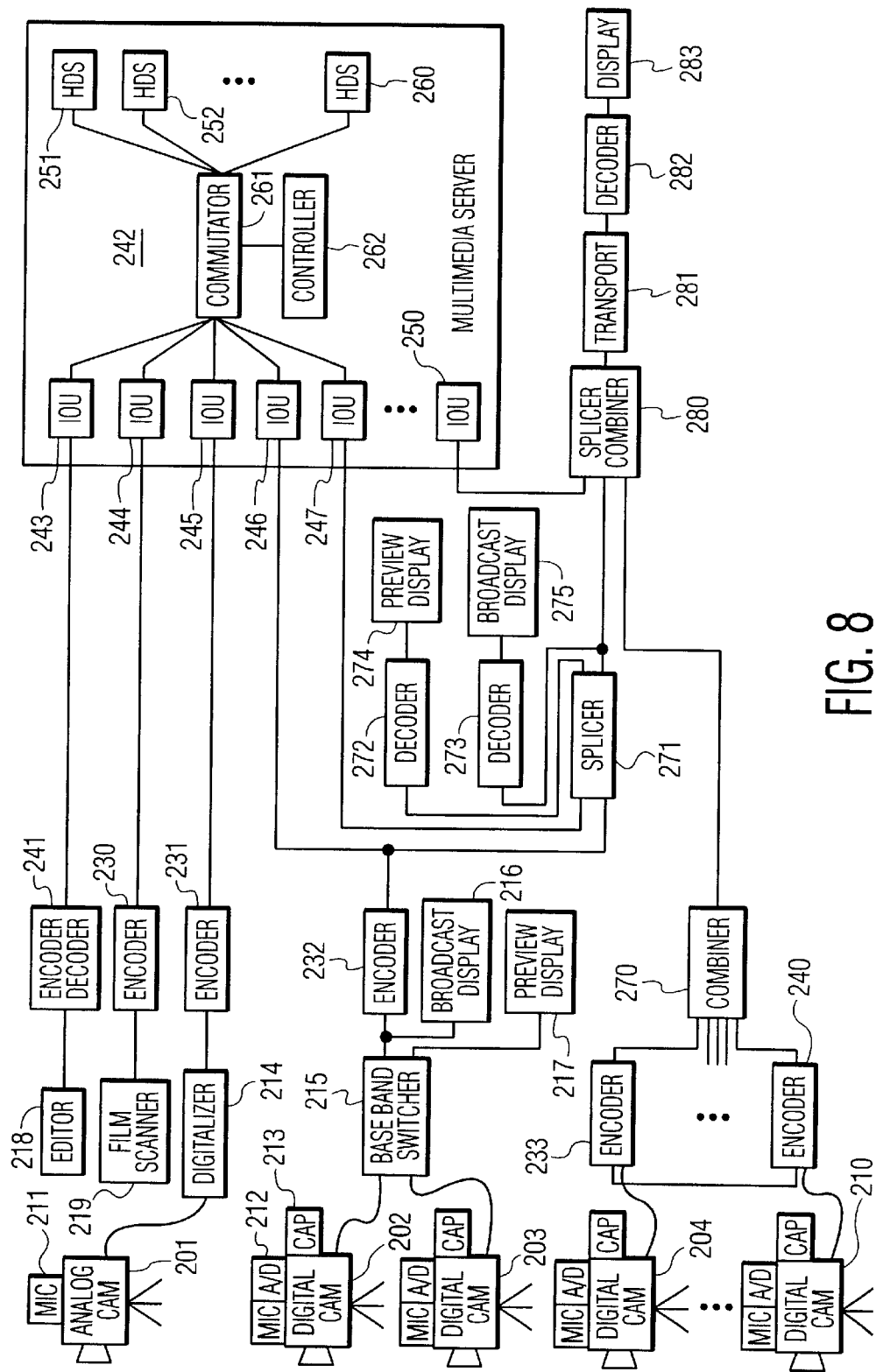
FIG. 8 is a block diagram of the overall multimedia delivery system of the invention.

FIG. 8 illustrates the overall system 200 of the invention. Multimedia data is provided into the system by analog camera 201 and digital cameras 202–210. The cameras are typically associated with microphones 211 to provide analog audio data. The digital cameras in this example, include digitalizers 212 to convert the analog sound into digital sound, and caption generators 213 to provide captions. The digital cameras may be analog cameras with analog-to-digital (A/D) converters to convert analog video into digital video, or preferably digital cameras that convert analog light directly into digital electrical signals using a CCD array. Input from analog camera 201 is processed by digitalizer 214 which includes an A/D converter for pictures and sound. In some studio situations a base band (uncompressed) crossover switcher 215 can be used, for example, to switch from one camera to another between pictures or from one microphone to another. Within the studio the base band digital signal can be directly viewed by displays 216, 217. Digital base band signals may also be provided by video frame editor 218, or film to digital data scanner 219.

The base band digital signals are encoded by encoders 230–240 to provide a bit stream that is compressed according to the MPEG-2 specification. Encoder/decoder 241 is provided for multimedia editors used to revise uncompressed individual frames of the multimedia data.

The encoded multimedia data may be stored in a multimedia server 242 also known as a video server. During storage, input and/or output (I/O) units (IOUs) 243–250 pack the data stream into disk blocks. Groups of the disk blocks are striped across hard drive systems (HDSs) 251–260 by commutator 261. Each HDS includes one or more redundant arrays of inexpensive disks (RAID) and respective RAID disk controllers (not shown). Typically, each RAID includes 2 to 14 hard drives across which the groups of blocks are striped within the HDS. Thus, each IOU has continuous access for reading or writing all the files in all the HDSs. A controller 262 schedules all the switching through the commutator to connect the IOUs with the HDSs in a round robin or more complex manner so that every IOU has full bandwidth access to all the data in all the HDSs.

Encoders 233–240 communicate together so that packets from a large number of encoders can be easily intermixed by combiner 270 into a single data stream, including a multitude of programs. Splicer 271 is a simple digital PTA switcher with two input streams and two output streams. Decoders 272 and 273 are simple one stream decoders for each stream output from splicer 270. The decoded output (uncompressed base band) from decoders 272 and 273 is connected to local displays 274 and 275 respectively so that within the studio, the preview channel and the broadcast channel can both be viewed.

At the head-end of a cable TV distribution system a complex splicer-combiner 280 outputs multiple selected programs from multiple inputs including inputs carrying multiple programs. Transport system 281 for a cable TV system would be an optical fiber network from the head end to multiple local nodes and coaxial cables from each local node to multiple customer locations (e.g. 500 homes).

In the customer's home a decoder 282 includes a splicer for seamlessly switching channels between a multitude of programs provided through the cable system. The decoder decodes one of the programs which is viewed by the customer on digital display 283.

Figure 9:
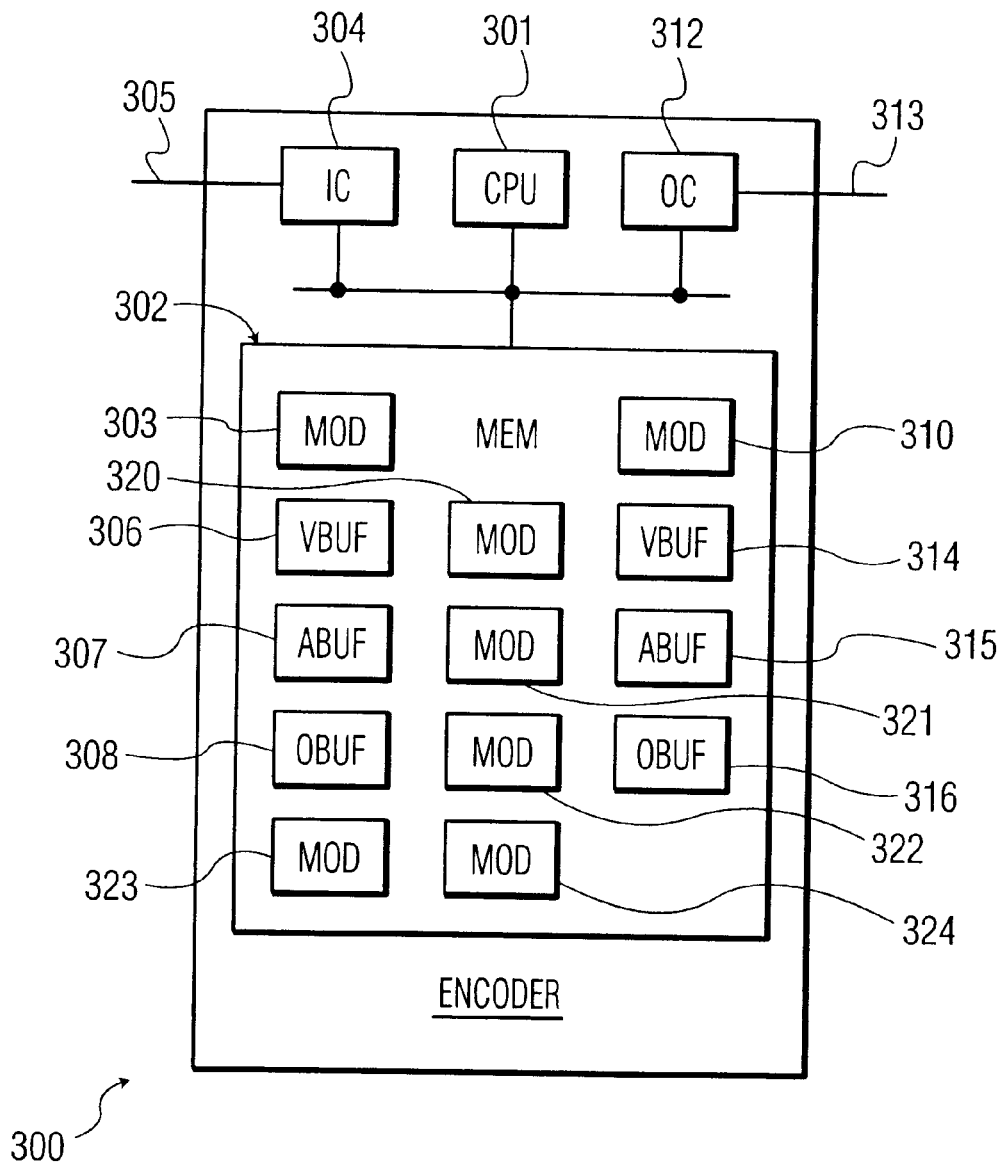
FIG. 9 is a block diagram of the encoder of the invention.

FIG. 9 illustrates an encoder 300 of the invention. The encoder includes a microcomputer or microcontroller CPU 301 communicating with memory 302. The memory includes a module 303 to control the CPU and input circuit (IC) 304 to copy uncompressed digital multimedia data from the input 305 into input buffers in memory. Video data is copied into input video buffer 306, audio data is copied into input audio buffer 307, and other data such as captions is copied into another input buffer 308. Alternately, multiple inputs each with their own input circuit could have been provided for respective types of data. The input circuits may be input processors, direct memory devices or other common I/O circuitry which are well known in the art. The memory also includes a module 310 which controls the CPU and output circuit (OC) 312 to copy packets of the encoded multimedia data from the output buffer in the memory onto output 313. Video packets are copied from the output video buffer 314, audio packets are copied from the audio output buffer 315, and other type of packets are copied from another buffer 316 onto the output. Alternately, one buffer could have been used for all the input and another buffer used for all the output or even a single buffer could be used for all the input and output data. Module 320 reads data from the input video buffer for a picture, compresses the picture in accordance with MPEG-2, encapsulates the compressed video data into packets with-video data payloads, and stores the packets into output video buffer 314. The GOPS created by module 320 include a P-frame at the end of each GOP in display order. Module 321 reads data from the input audio buffer for a predetermined period of time, compresses the data (according to the MPEG audio or Dolby AC3 standard), encapsulates the compressed data into the payloads of multiple packets, and stores the packets into the output audio buffer 315. Module 322 reads data from the other input buffer, and creates the other packets such as PCR packets and PMT packets, and stores the other packets into the other output buffer 316. Module 323 determines the order of the packets to be output by module 310 to prevent overflow or underflow of the decoder buffer. Module 323 edits the packets to indicate the location of every video splice-in point in the respective video packet immediately before every I-frame and to indicate the position of a seamless video splice-out point before every P-frame (in the respective video packet immediately before every P-frame) and after every I-frame and P-frame (in the last respective packet of the P-frame). Module 323 communicates with module 320 to control the compression of the video data to prevent underflow or overflow of the VBV. Module 323 can provide dummy data or drop B-frames if required to meet predetermined requirements for ending delay after a splice-out and startup delay after a splice-in so that the splice-in and splice-out points in the stream are seamless splice-in and splice-out points. Module 324 indicates the location of an audio splice-in point at the beginning of every audio frame (by editing the last packet of the audio ES immediately before the audio frame) and the location of an audio splice-out point at the end of every audio frame (by editing the last packet of the audio frame).

Figure 10:
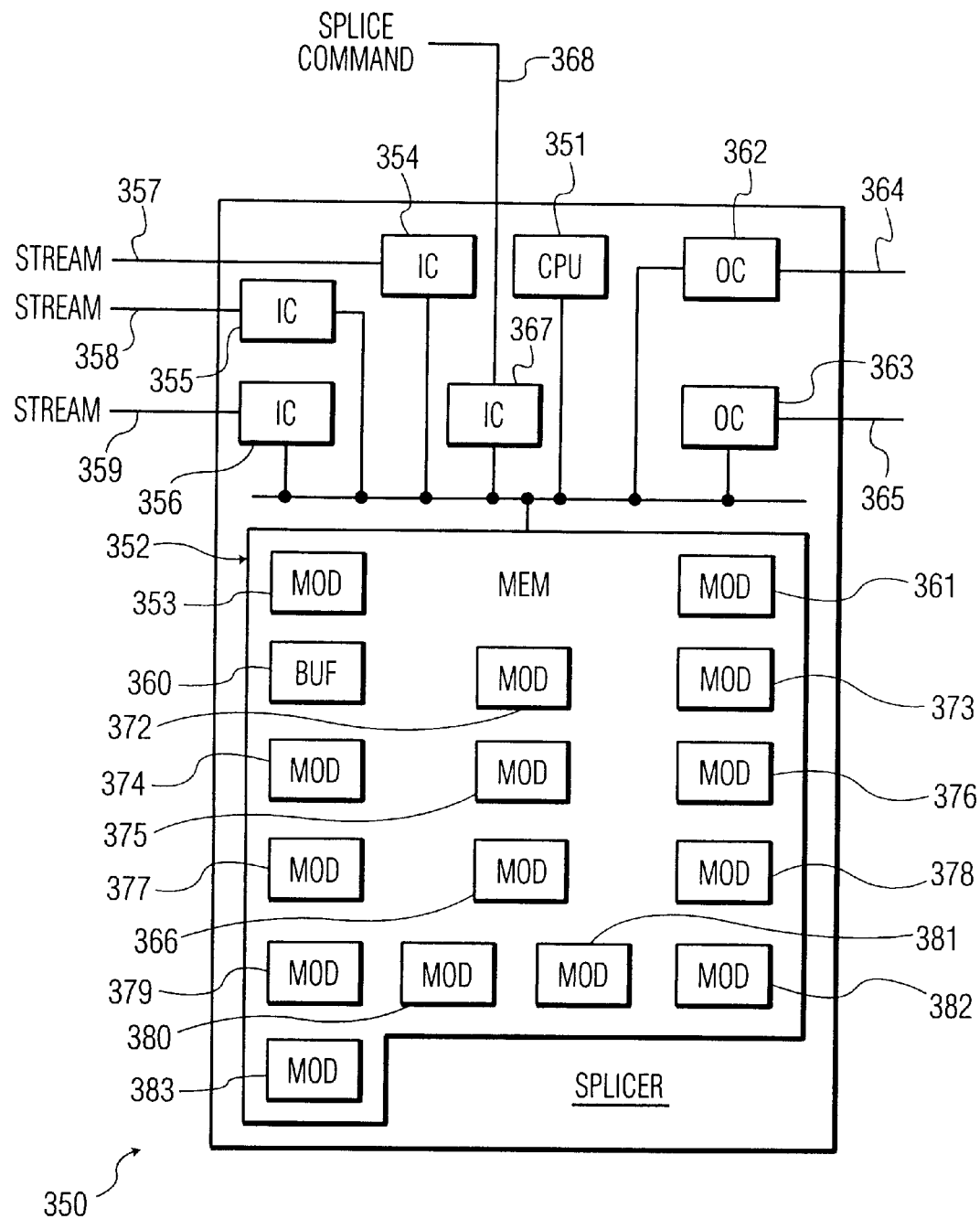
FIG. 10 is a block diagram of the splicer of the invention.

FIG. 10 shows a splicer 350 of the invention. The splicer includes a microcomputer or microcontroller CPU 351 communicating with memory 352. The memory includes computer software modules to control the CPU and other hardware of the splicer and includes buffers for storing input data and data to be output. Each software module includes multiple sub-modules to perform all the required functions of such software module. Module 353 controls the CPU and ICs 354–356 to copy data from multimedia data streams at input 357–359 respectively into a buffer 360 in memory. Module 361 controls the CPU and OCs 362 and 263 to copy packets from buffer 360 onto outputs 364 and 365 respectively. Module 366 controls the CPU and IC 367 to receive commands from command input 368 including a splice command to splice the second program to the first program.

Module 372 selects a splice-in point of the first component (e.g. video) in the second program depending on the splice command, and module 373 selects a splice-out point of the first component in the first program, approximately aligned with respect to the splice-in point of the first component in the second program. The maximum difference in the time of the splice-in and splice-out for a respective component depends on the size of the buffer of the splicer. Module 361 includes module 374 which splices the first component of the first program out at the selected splice-out point of the first component and splices the first component of the second program in at the selected splice-in point of the first component.

Another module 375 selects a splice-in point for the second component (e.g. audio) in the second program, at which the begin-presentation time of the earliest presented portion of the second component of the second program (after the splice-in point for the second component in the stream), is equal or after the end-presentation time of the latest presented portion of the first component of the first program (before the splice-out point for the first component in the stream). Module 376 selects a splice-out point in the stream for the second component of the first program, at which the end-presentation time for the latest presented portion of the second component in the first program (before the splice-out point for the second component in the stream) is equal or before the begin-presentation time for both: the earliest presented portion of the first component of the second program (after the splice-in point of the first component in the stream); and the earliest presented portion of the second component of the second program (after the splice-in point of the second component in the stream).

Module 361 also includes module 377 which splices the second component of the first program out at the selected splice-out of the second component and splices the second component of the second program in at the selected splice-in point of the second component.

Module 366 includes module 378 to store a specified splice time in buffer 360 and module 372 selects the video splice-in closest in time to the time specified for the splice time. Alternately, if the splice command is splice immediately, the next splice-in recognized in the stream may be selected. Module 379 determines if any video frames must be dropped to prevent overflowing the decoder's video buffer and deletes any such frames. Preferably no pictures have to be dropped, but black pictures or repeat pictures may be required if the encoder does not guarantee that all splice-in and splice-out points are seamless or if seamless audio is required. Module 376 selects a splice-out point of the first component in the first program which is closer in time to splice-in point of the first component in the second program than any other one of a multitude of previous splice-out points of the first component in the first program.

Module 376 includes module 380 for determining the number of frames of the second component that must be skipped in order to prevent overflowing a buffer for the second component; and module 376 selects the splice-out point at which the end-presentation time of the latest presented portion previous to the splice-out point of the second component is significantly later than the begin-presentation time of the earliest presented portion after the slice-in point in the second program, depending on the determination so as to prevent overflowing the decoder buffer for the second component. Module 375 can select the audio splice-in point at the end of the last packet of the audio frame with an begin-presentation time closest to the begin-presentation time of first video picture presented after the video splice-in. Module 376 may select the audio splice-out point at the end of the last packet of an audio frame with an end-presentation time closest in time to the begin presentation time of the first audio frame presented after the audio splice-in point, or of the first video frame presented after the video splice-in point or closest in time to the end-presentation time of the last presented picture before the video splice-out point. Preferably, the seamless video splice-out points are predetermined and the packets in the program include information indicating the location of the seamless video splice-out points and module 376 includes module 381 for recognizing video splice-out indications including the splicing_point_flag=1, the splice_coutdown=0, the seamless_splice_flag=1, and if PID=PCR_PID then PCR_flag=1 in the MPEG-2 packet headers.

Preferably, the seamless video splice-in points are also predetermined and the packets in the programs include information indicating the location of the seamless video splice-in points and module 372 recognizes video splice-in indications including splicing_point_flag=1, splice_coutdown=−1, seamless_splice_flag=1 and if PID=PCR_PID then PCR_flag=1 in the MPEG-2 packet header. Preferably, module 376 selects the audio splice-out point by searching in the first program for the last packet of an audio frame in the first program with an end-presentation time which is equal or before the begin-presentation time of the first video picture presented after the video splice-in point in the second program. Also, module 375 selects the audio splice-in point by searching in the second program for the first audio frame with a begin-presentation time which is equal or after the begin-presentation time of the first video picture after the video splice-in point in the second program. Module 382 determines if one or more audio frames should be dropped before or after or both before and after the audio splice-in or splice-out point in order to prevent overflowing the audio buffer. Module 383 inserts a sequence_end_code between the last video picture of the first stream and the first video picture of the second stream.

Figure 11:
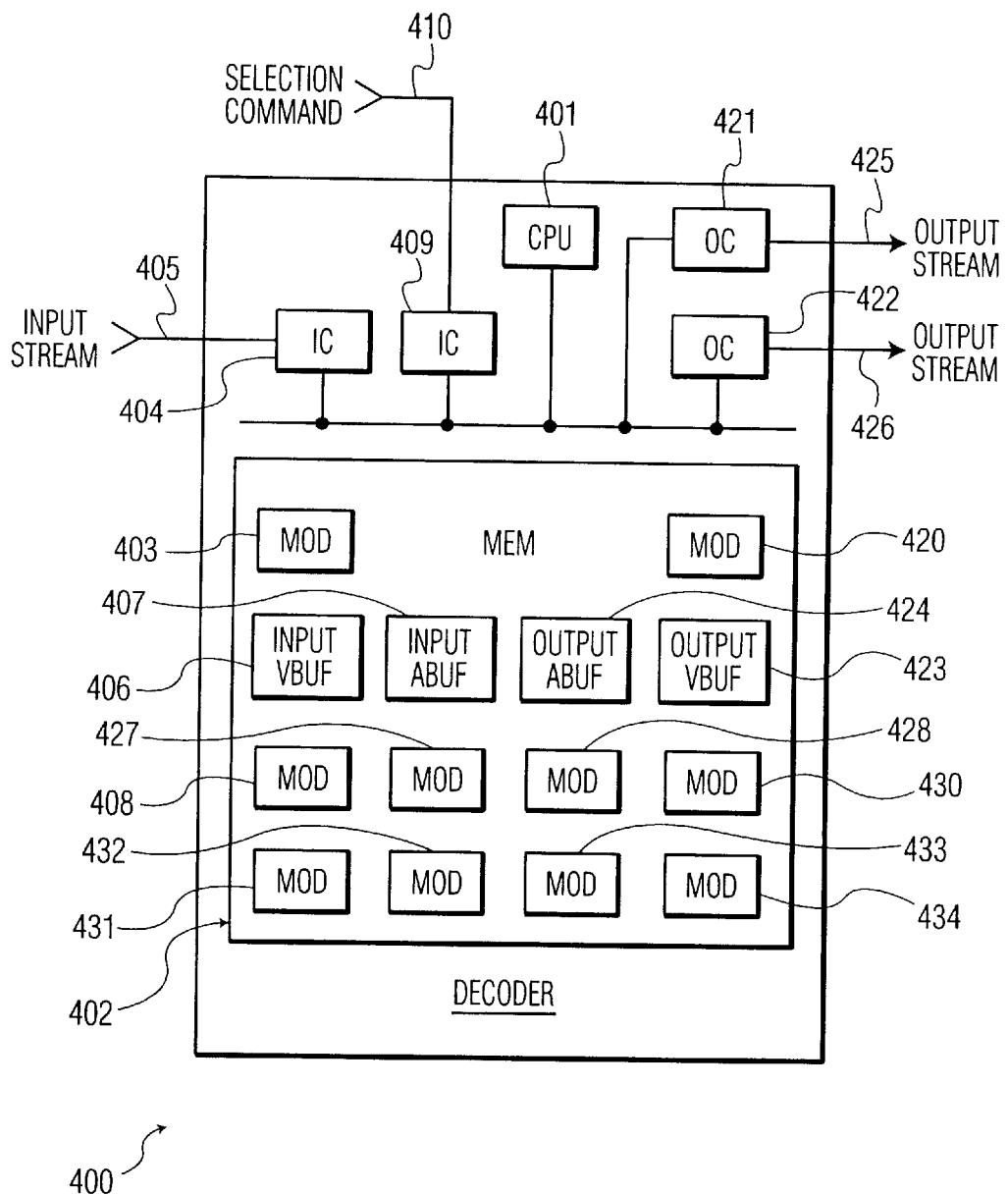
FIG. 11 is a block diagram of the decoder/splicer of the invention.

FIG. 11 illustrates a selective decoder 400 of the invention. The decoder includes a CPU 401 communicating with memory 402. The memory includes computer software modules to control the CPU and other hardware of the decoder and includes buffers for storing input data and data for output from the decoder. Module 403 controls the CPU and IC 404 to copy compressed data from a multi-program, multimedia, data stream at input 405 to memory 402 which includes copying compressed video data to input video buffer 406 and copying compressed audio data to input audio buffer 407. Software module 408 controls the CPU and IC 409 to receive commands from input 410 and stores the commands. The input stream includes a first, second and third program streams, and the first, second and third programs each include a video component stream and an audio component stream.

Software module 420 controls the CPU and OCS 421 and 422 to copy uncompressed data from an output audio buffer 423 and output video buffer 424 to uncompressed output multimedia data streams 425 and 426. Module 420 schedules the output according to the display time specified in the program streams of the output programs. Software module 427 converts compressed data from input video buffer 406 into uncompressed data in output video buffer 424. Software module 428 converts compressed audio data from input audio buffer 407 into uncompressed data in output audio buffer 424. Modules 427 and 428 schedule the decoding according to the specified decoding time specified in the program streams. Initially the uncompressed program stream at output 421 is the uncompressed product of the first program stream, and the uncompressed program stream at output 425 is produced from the third program stream.

Upon receiving a selection change command to switch from a first program to a second program at output 421, software module 430 selects a video splice-in point in the compressed video stream for the first program depending on the time specified in the command. Software module 431 selects a video splice-out in the uncompressed video stream for the second program that is approximately aligned with the video splice-in point in the first program. Preferably, the splice-out point is at the same position or at slightly later position in the stream than the video splice-in point. Module 427 stops decoding the video data for the first program after decoding the last decoded picture of the video stream before the video splice-out point and starts decoding the video data for the second program starting with the first picture to be decoded after the video splice-in point. Software module 432 adjusts the decoding times and presentation times of the pictures in the video stream for the second program after the video splice-in point so that pictures will be continuous. Also, module 432 adjusts the decoding and presentation times of the audio stream for the second program.

Software module 433 determines how many audio frames should be dropped and which to drop in order to prevent audio anomalies, and then selects an audio splice-in point in the compressed audio stream for the second program. The begin-presentation time of the first audio frame after the splice-in point is the same or slightly after the end-presentation time of the last presented picture of the video stream for the first program before the video splice-out point for the first program. Software module 434 selects an audio splice-out in the uncompressed audio stream for the first program that is approximately aligned with the audio splice-in point in the second program. The end-presentation time of the first audio frame before the audio splice-out is equal to or before the begin-presentation time of both the first picture after the video splice-in and the first audio frame after the audio splice-in of the second program. Module 428 stops decoding the audio data for the first program after decoding the last decoded audio frame of the audio stream before the audio splice-out point and starts decoding the audio data for the second portion starting with the first audio frame to be decoded after the audio splice-in point.

Figure 12:
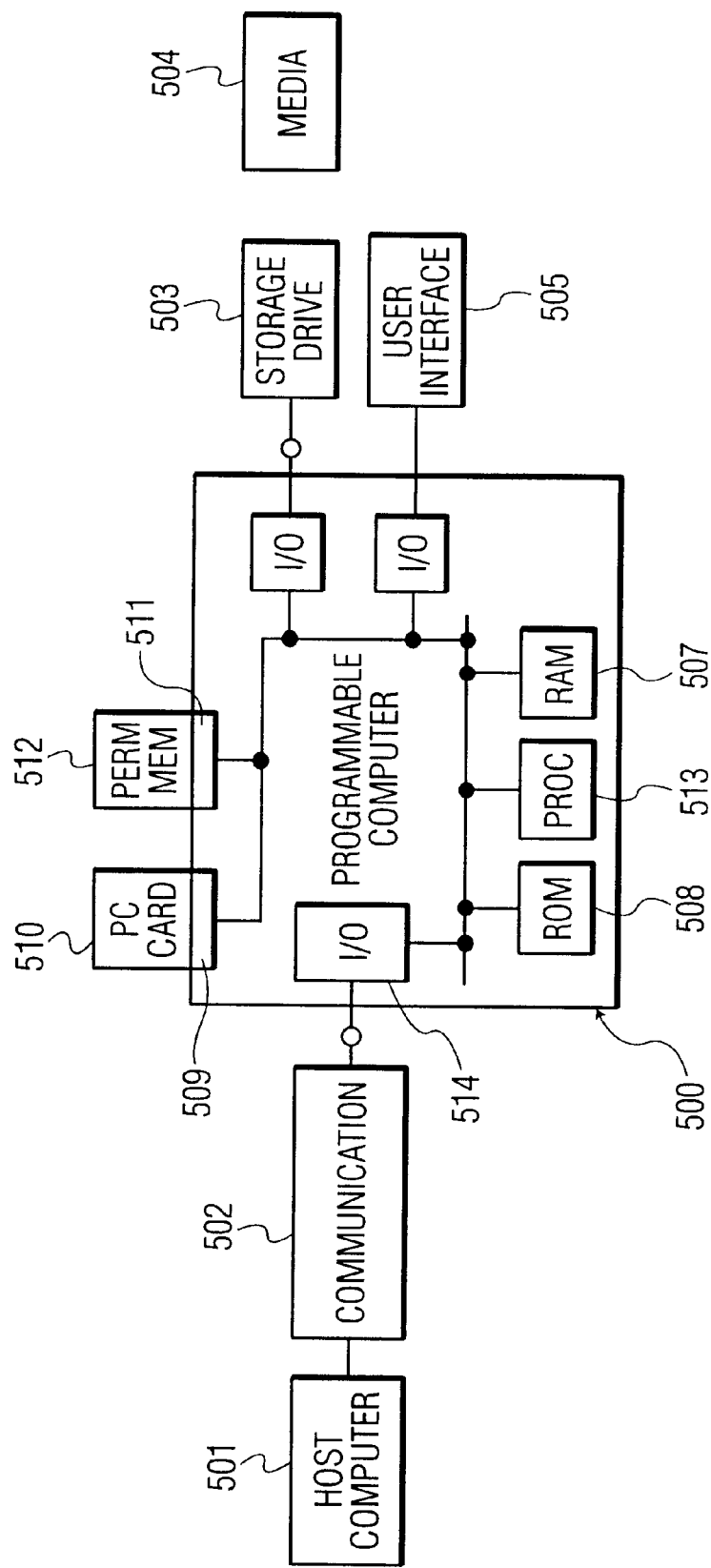
FIG. 12 is a block diagram of apparatus used to program a computer system to implement the apparatus of the invention.

FIG. 12 illustrates a programmable computer system 500 and various example apparatus for programming such a programmable computer. The computer system may be programmed either by connecting non-volatile memory (e.g. ROM, PROM, EEPROM, flash memory, battery backed SRAM) containing programmed structures to the programmable computer or by providing signals to the programmable computer which may be applied to memory of the programmable computer to provide programmed structures. Another computer system 501 such as an Internet server may be connected through a communication apparatus 502 to system 500 to provide signals for programming system 500. Apparatus 502 may include a copper or optic cable, radio, infrared, or network such as Ethernet, ARCnet, Token ring, or a modem and telephone system. A storage drive 503 may have integral media 504 and be connected and disconnected to the system 500 or drive 503 may be integral with system 500 and receive signals from removable computer media 504. System 500 may include a user interface 505 and program input module 506, and written materials may be provided for input. A user may input the signals using apparatus (not shown)of the user interface such as a keyboard, text scanner, microphone, camera or bar code reader. The signals provided to system 500 may be copied to storage drive 503 for later recall into volatile memory 507 or stored in non-volatile memory 508 to provide programmed apparatus in memory. Alternately the system may be programmed by providing programmed non-volatile memory. System 500 may include a slot 509 into which a cartridge 510 containing non-volatile memory such as a PC flash memory card, may be connected to provide programmed apparatus. System 500 may include a socket 511 into which a non-volatile package 512 may be inserted to provide programmed apparatus. System 500 may be fabricated with non-volatile integral memory 508 to provide programmed apparatus. The programmed structures include programs and other data in memory which control a micro-processor 513 and I/O processors e.g. 114 of the programmable computer to implement computer processes. The computer system may be a workstation, modem, PC card, printer, or other software upgradable component. Other well known methods of programming a computer system may also be used.

The invention has been described with reference to specific embodiments including the best mode for carrying out the invention, and with sufficient detail that anyone skilled in the art can make and use the invention. Those skilled in the art may modify these embodiments or provide other embodiments within the spirit of the invention, and thus, the description does not limit the present invention to the disclosed embodiments. The invention is limited only by the following appended claims.

We claim:

1. A method for splicing multimedia programs in multimedia data streams, comprising:

providing in the same or different multimedia data streams, first and second programs, each of the first and second programs including a first media component of the same first media and a second media component of the same second media, the second media being a different media than the first media, each of the first and second both media components of each of the first and second programs having a multitude of splice-in points with begin-presentation times of first presented portions of the component after the splice-in and a multitude of splice-out points with end-presentation times of the last presented portion of the component before the splice-out, the times being relative to their positions in the stream;

transmitting the first and second component of the first program in an output stream;

receiving a command to splice the second program to the first program;

selecting a splice-in point in the stream for the first component in the second program;

selecting a splice-out point in the stream for the first component in the first program, with a position in the stream approximately aligned with the position in the stream of the splice-in point of the first component of the second program; and the begin-presentation time for the first portion of the first component presented after the splice-in of the first component is equal or later than the end-presentation time for the last presented portion of the first component before the splice-out of the first component;

transmitting the first component of the second program and the second component of the first program in the output stream;

splicing the first component of the first program out at the selected splice-out point for the first component and splicing the first component of the second program in at the selected splice-in point for the first component;

selecting a splice-in point in the stream for the second component in the second program at which the begin-presentation time of the first presented portion of the second component after the splice-in is equal or after the end-presentation time of the latest presented portion of the first component before the splice-out point of the first component;

selecting a splice-out point in the stream for the second component in the first program, at which: the position in the stream of the splice-out point for the second component is approximately aligned with the position in the stream of the splice-in point of the second component; and an end-presentation time of the latest presented portion of the second component before the splice-out is equal or before the begin-presentation times of the earliest presented portions of both: the first component after the splice-in of the first component; and the second component after the splice-in of the second component;

splicing the second component of the first program out at the selected splice-out of the second component and splicing the second component of the second program in at the selected splice-in point of the second component; and transmitting the first and second component of the second program in the output stream.

2. The method of claim 1 in which:

selecting a splice-in point in the stream for the second component includes selecting a point at which the begin-presentation time for the earliest presented portion of the second component after the splice-in for the second component is equal or after the begin-presentation time for the earliest presented portion of the first component after the selected splice-in for the first component.

3. The method of claim 1 in which:

selecting a splice-out point in the stream for the second component includes selecting a point at which the end-presentation time for the latest presented portion of the second component before the splice-out is equal or before the end-presentation time for the latest presented portion of the first component before the selected splice-out for the first component.

4. The method of claim 1 in which:

portions of at least one of the components of the first and second programs contain presentation time data from which a begin-presentation time and end-presentation time can be derived and the method includes adjusting the time data for the one component in the second program after the splice-in point for the one component to be consistent with the time data of the one component in the first program; and at least one of the components of the first and second programs contain a decode time data from which a begin-decoding time can be derived and the method further comprises adjusting the decode time data for the component in the second program after the splice-in point for the one component to be consistent with the decode times of the one component in the first program.

5. The method of claim 1 in which:

selecting a splice-out point of the first component includes selecting the splice-out point which is closer in time to the splice-in point of the first component in the second program than any other one of a multitude of previous splice-out points of the first component, for which multitude of previous splice-out points, the begin-presentation time for the first portion of the first component presented after the splice-in of the first component that is equal or later than the end-presentation time for the last presented portion of the first component before the splice-out of the first component.

6. The method of claim 1 in which:

video, audio, or other component splice-in points are indicated in a packet that follows a splice-in point for a respective component by if PID=PCR_PID, then setting PCR_flag=1 and providing a PCR value in the header of the packet; and selecting a splice-in point for the respective component includes searching for such flag value.

7. The method of claim 1 in which:

selecting a splice-in point in the stream for the second component includes selecting a point at which the begin-presentation time for the earliest presented portion of the second component after the splice-in for the second component is equal or after the begin-presentation time for the earliest presented portion of the first component after the selected splice-in for the first component;

selecting a splice-out point in the stream for the second component includes selecting a point at which the end-presentation time for the latest presented portion of the second component before the splice-out is equal or before the end-presentation time for the latest presented portion of the first component before the selected splice-out for the first component;

portions of at least one of the components of the first and second programs contain presentation time data from which a begin-presentation time and end-presentation time can be derived and the method includes adjusting the time data for the one component in the second program after the splice-in point for the one component to be consistent with the time data of the one component in the first program;

at least one of the components of the first and second programs contain a decode time data from which a begin-decoding time can be derived and the method further comprises adjusting the decode time data for the component in the second program after the splice-in point for the one component to be consistent with the decode times of the one component in the first program;

the first and second programs include a program clock reference and the method further comprises adjusting the program clock reference time in the second program after the first splice-in of the second program in the stream to be consistent with the program clock reference in the first program;

the splice command includes a specified splice time; and selecting a splice-in point for the first component in the second program includes selecting the splice-in point closest in time to the time specified for the splice time;

selecting a splice-out point of the first component includes selecting the splice-out point which is closer in time to the splice-in point of the first component in the second program than any other one of a multitude of previous splice-out points of the first component, for which multitude of previous splice-out points the begin-presentation time for the first portion of the first component presented after the splice-in of the first component that is equal or later than the end-presentation time for the last presented portion of the first component before the splice-out of the first component;

selecting a splice-out of the second component, includes: determining the number of frames of the second component that must be dropped in order to prevent overflowing a decoding buffer for the second component; and selecting splice-in and splice-out points of the second component depending on the determination in order to drop the determined number of frames;

one or more portions of the second component are dropped including either: portions with begin-presentation times before the end-presentation time of the last portion of the first component before the splice-out of the first component; portions with end-presentation times after the begin-presentation time of the first portion of the first component after the splice-out of the first component; or both;

the first component is a video component and the second component is an audio component;

video, audio or other component seamless splice-out points are indicated in a packet for the respective component immediately before the splice-out point by setting one or more of: the splicing_point_flag=1; the splice_coutdown=0; and the seamless_splice_flag=1; and selecting a splice-out point for the respective component includes searching for packets with one or more of: the splicing_point_flag=1; the splice_coutdown=0; and the seamless_splice_flag=1;

video, audio or other component seamless splice-out points are also indicated in a packet for the respective component immediately before the splice-out point by if PID=PCR_PID, then setting PCR_flag=1 and providing the PCR value in the packet; and selecting a splice-out point for the respective component includes searching for packets with PID=PCR_PID, PCR_flag=1, and a PCR value;

video, audio or other component seamless splice-in points are indicated in a packet for the respective component immediately after the splice-in point by setting one or more of: the splicing_point_flag=1; the splice_coutdown=−1; and the seamless_splice_flag=1; and selecting a splice-in point for the respective component includes searching for packets with one or more of: the splicing_point_flag=1; the splice_coutdown=−1; and the seamless splice flag=1;

video, audio, or other component seamless splice-in points are also indicated in a packet that follows a splice-in point for a respective component by if PID=PCR_PID, then setting PCR_flag=1 and providing a PCR value in the header of the packet; and selecting a splice-in point for the respective component includes searching for packets with PID=PCR_PID, PCR_flag=1, and a PCR value;

selecting the audio splice-out point includes searching for the last presented audio frame in the first program with an end-presentation time which is equal or before the begin-presentation time of the first presented video picture after the video splice-in point;

selecting the audio splice-in point includes searching in the second program for the first presented audio frame in the second program with a begin-presentation time which is equal or after the end-presentation time of the last presented video picture before the video splice-out point in the first program;

the first program is received from a first encoder in a first data stream and the second program is received from a second encoder in a second stream, and the first and second encoders cooperate to constrain the programs so that at every video splice-in point in one program there is a corresponding video splice-out point approximately aligned in time with the splice-in point in the other program;

the encoder for the first program and the encoder for the second program cooperate so that at the video splice-in point in the second program, the ending delay of the first program at the corresponding video splice-out point is at least the period of one video picture in the first program less than the startup delay for the second program at the video splice-in point so that all video splice-in points are seamless splice points;

one of the components in each of the first and second programs includes only self contained decodable frames which define a splice point at both the point immediately before the beginning of the first packet of the frame and the point immediately after the end tip of the last packet of the frame, and all the splice points for the component are both splice-in points and also splice-out points;

for portions of the first and second components approximately aligned in the stream, the begin-presentation time and a begin-decoding time of the first component is delayed for approximately 33 to 300 milliseconds with respect to the begin-presentation time of the second component;

the splice command is received by a play-to-air splicer in which: each of the first and second programs arrive at the same splicer input or at separate splicer inputs in different respective data streams; and only one of the programs exits from a data stream output of the splicer;

providing first and second programs includes providing multiple seamless video splice-in points and multiple seamless video splice-out points in each of the first and second programs;

the frame rates for the first and second programs are different and the splicer inserts a sequence_end_code in the output stream between the last video picture of the first program and the first video picture of the second program in the stream;

the MPEG-2 group of pictures in presentation order, begin with an I-frame and end with a P-frame; and the first and second programs include a third media component which is captions for the video pictures.

8. The method of claim 1 in which:

selecting a splice-in point of the first component includes selecting the next splice-in point recognized in the stream after receiving the command to splice;

each of the first and second programs is compressed by an independent respective encoder which guarantees a predetermined start-up delay at each seamless splice-in point and a predetermined ending delay at each splice-out point whereby overrun is prevented when splicing such encoded programs;

selecting a splice-out of the first component includes: determining the number of portions of the first component that must be skipped in order to prevent overflowing a decoding buffer for the first component; and selecting a splice-out point of the first component in the first program that is sufficiently previous to the splice-in point of the first component in the second program depending on the determination so as to prevent overflowing the decoder buffer for the first component so that the first component may be spliced seamlessly;

selecting a splice-out point in the second component includes selecting a splice-out point at which the end-presentation time of the latest presented portion of the second component before the splice-out point for the second component is closer than the end-presentation time of any other portion of the second component before the splice-out point to the begin-presentation time of the first presented portion of the second component before the splice-out point;

providing first and second programs includes providing a program association table that identifies a packet identifier for a program map table for each of the first and second programs in the stream; and the splice command to switch from a first program to a second program is received by a decoder which receives both of the first and second programs in the same data stream and the decoder selects packets for copying into a decoder buffer depending on the splice command, a packet identifier which identifies a segment of a component of a program for each packet of the first and second media of the first and second programs, and a program map table which identifies the packet identifiers for a program.

9. A multimedia encoder, comprising:

a processing unit;

a memory communicating with the processing unit and including one or more input buffers and one or more output buffers;

one or more network inputs for uncompressed programs communicating with the input buffers in the memory;

at least one network output for a data stream of one or more compressed programs communicating with the output buffers in the memory;

means for receiving the uncompressed programs from the inputs into the input buffers;

means for compressing the uncompressed portions of the programs in the input buffers into compressed portions of the programs in the output buffers;

means for transmitting the compressed programs from the output buffers onto the network output;

video seamless splice-out providing means to control the encoding for providing a multitude of video seamless splice-out points in at least one of the compressed programs; and video seamless splice-in providing means to control the encoding for providing a multitude of video seamless splice-in points in at least one of the compressed programs.

10. The encoder of claim 9, in which:

the programs include a video component and the encoding includes MPEG-2 encoding for compressing the programs and the video splice-in providing means provide a seamless video splice-in point at the beginning of every I-frame in the video component of the at least one compressed program;

the encoder further comprises video splice-out providing means for providing a multitude of video splice-out points in the at least one compressed program;

the encoder further comprises video seamless splice-in indicating means for indicating the locations of the seamless video splice-in points in the compressed programs;

if PID=PCR_PID, then the video seamless splice-in indicating means set PCR_flag=1 in the packet header of the first packet following the seamless video splice-in point;

the encoder further comprises video seamless splice-out providing means for providing a multitude of seamless video splice-out points in the at least one compressed program;

the video seamless splice-out providing means provide a seamless video splice-out point at the end of every I and P-frame in the video component in presentation order;

the encoder further comprises video seamless splice-out indicating means for indicating the locations of the video seamless splice-out points in the compressed programs;

if PID=PCR_PID, then the video splice-out indicating means set PCR_flag=1 in the packet header of the last packet before the video seamless splice-out point;

the encoder further comprises seamless video means for providing that at video seamless splice-in points and at video seamless splice-out points, the ending delay at the video seamless splice-out points is the period of one frame less than a predetermined startup delay at the video seamless spice-in points so that all the video seamless splice-in and video seamless splice-out points are seamless;

the encoder further comprises audio corresponding splice-in providing means for providing an audio splice-in point corresponding to every video seamless splice-in point in the at least one compressed program, at a beginning of respective corresponding audio frames;

the encoder further comprises audio corresponding splice-in indicating means for indicating the locations of the audio splice-in points that correspond to the video seamless splice-in points in the compressed programs;

the locations of the audio corresponding splice-in points being indicated in a packet immediately following respective corresponding audio splice-in point;

if PID=PCR_PID, then the audio splice-in indicating means set PCR_flag=1 in the packet header of the first packet following the splice-in point;

the encoder further comprises audio corresponding splice-out providing means for providing an audio splice-out point corresponding to every video seamless splice-out point in the at least one compressed program at an end of respective audio frames;

the encoder further comprises audio corresponding splice-out indicating means for indicating the locations of the audio splice-out points in the at least one compressed program that correspond to seamless video splice-out points;

the locations of the audio corresponding splice-out points being indicated in a packet immediately preceding a respective audio corresponding splice-out point;

if PID=PCR_PID, then the audio splice-out indicating means set PCR_flag=1 in the packet header of the last packet before the splice-out point; and the encoder further comprises means for preventing audio buffer overflow by selecting audio corresponding splice-in points at which the begin-presentation time of the first audio frame following the audio corresponding splice-in point is the same or after the begin-presentation time of the first presented video picture that follows the corresponding video seamless splice-in point, and selecting audio corresponding splice-out points at which the end-presentation time of the last audio frame before the audio corresponding splice-out point is equal or before the end-presentation time of the last presented video picture that precedes the corresponding video seamless splice-out point.

11. A multimedia data stream splicer, comprising:

a processing unit;

memory communicating with the processing unit and including one or more buffers;

one or more network inputs communicating with the buffers in the memory;

at least one network output communicating with the buffers in the memory;

means for receiving one or more data streams from the network inputs into the buffers, the input data streams include a first and second programs, each of the first and second programs including a first component of a first media and a second component of a second media;

means for transmitting the components of one or more programs from the buffers onto the network output as one or more data streams, the transmitting means transmit the first and second component of the first program as an output program;

means for receiving a splice command to splice the second program to the first program as the output program;

means for selecting a splice-in point from multiple splice-in points of the first component in the second program depending on the splice command;

means for selecting a splice-out point from multiple splice-out points of the first component in the first program, the splice-out point for the first component being approximately aligned in the stream with the splice-in point for the first component, and the end-presentation time of the last presented portion of the first component before the splice-out point for the first component is equal or before the begin-presentation time of the first presented portion of the first component after the splice-in point for the first component;

the transmitting means splice the first component of the first program out at the selected splice-out point of the first component and splice the first component of the second program in at the selected splice-in point of the first component for transmitting the second component of the first program together with the first component of the second program as an output program;

means for selecting a splice-in point for the second component in the second program, at which the begin-presentation time of the earliest presented portion of the second component after the splice-in for the second component is equal or after the end-presentation time of the latest presented portion of the first component before the splice-out point for the first component;

means for selecting a splice-out point for the second component in the first program, at which the end-presentation time of the latest presented portion of the second component before the splice-out point for the second component is equal or before the begin-presentation times for the earliest presented portions of both: the first component after the splice-in point for the first component; and the second component after the splice-in point for the second component; and the transmitting means splice the second component of the first program out at the selected splice-out of the second component and splice the second component of the second program in at the selected splice-in point of the second component for transmitting the first and second component of the second program as the output program.

12. The splicer of claim 11 in which:

the means for receiving the splice command store a specified splice time and the means for selecting a splice-in point select the splice-in point closest in time to the time specified for the splice time;

the means for selecting a splice-out point of the first component in the first program select the splice-out point which is closer in time to the splice-in point of the first component in the second program than any other one of a multitude of previous splice-out points of the first component in the first program wherein the end-presentation time of the last presented portion of the first component before the splice-out point for the first component is equal or before the begin-presentation time of the first presented portion of the first component after the splice-in point;

the means for selecting a splice-out of the second component determine the number of frames of the second component that must be skipped in order to prevent overflowing a buffer for the second component; and select the latest a splice-out point in the stream for the second component at which the end-presentation time of the latest presented portion previous to the splice-out point of the second component is sufficiently earlier than the begin-presentation time of the earliest presented portion after the splice-in point in the second program, depending on the determination so as to prevent overflowing the decoder buffer for the second component;

the means for receiving and means for transmitting respectfully receive and transmit MPEG-2 data streams;

the first component of both the first and second programs is a video component and the second component of both the first and second programs is an audio component;

the seamless video splice-out points are predetermined and the packets in the program include information indicating the location of the seamless video splice-out points and the means for selecting video splice-out points recognize video splice-out indications;

the means for selecting video splice-out points recognize as a splice-in point, the end of a packet in which: the splicing_point_flag=1, the splice_coutdown=0, the seamless_splice_flag=1, and if PID=PCR_PID then PCR_flag=1 and the PCR value is provided in the MPEG-2 packet headers;

the seamless video splice-in points are predetermined and the packets in the programs include information indicating the location of the seamless video splice-in points and the means for selecting video splice-in points recognize the video splice-out indications;

the means for selecting video splice-in points recognize as a splice-out point, the end of a packet in which: splicing_point_flag=1, splice-coutdown=-1, seamless_splice_flag=1 and if PID=PCR_PID then PCR_flag=1 and the PCR value is provided in the MPEG-2 packet header;

the means for selecting the audio splice-out point search in the first program for the last packet of an audio frame in the first program with an end-presentation time which is equal or before the begin-presentation time of the first video picture presented after the video splice-in point in the second program;

the means for selecting the audio splice-in point search in the second program for the first audio frame with a begin-presentation time which is equal or after the begin-presentation time of the first video picture after the video splice-in point in the second program;

the splicer includes means for dropping one or more audio frames before or after or both before and after the audio splice-in or splice-out point in order to prevent overflowing the audio buffer;

the splicer further comprises means to insert a sequence_end_code between the last video picture of the first stream and the first video picture of the second stream.

13. The splicer of claim 11 in which:

the means for selecting a splice-in point of the first component select the next splice-in point recognized by the splicer after receiving the command to splice;

the means for selecting a splice-out of the first component point determine the number of video pictures that must be-skipped to prevent overflowing a video decoding buffer; and select a splice-out point of the first component in the first program that is previous to the splice-in point of the first component in the second program depending on the determination so as to prevent overflowing the decoder buffer;

the means selecting a splice-out point in the second component of the first program select a splice-out point that is closer in begin-presentation time to the second component splice-in point in the second program than any other previous second component splice-out point in the first program;

the means for determining seamless video splice-in points calculate whether a potential splice-in point is seamless;

means for switching output from one program to another program received in the same data stream;

multiple programs are received in at least one input data stream and means for receiving receive a program association table that identifies a packet identifier for a program map table for programs in the stream.

14. A selective decoder for a multimedia data stream including multiple programs, comprising:

a processing unit;

a memory communicating with the processing unit, including one or more buffers;

one or more network inputs communicating with the buffers of the memory;

at least one output for uncompresses data of one or more programs, communicating with the memory;

means for selecting fewer than all the programs available in the multimedia data stream;

means for receiving a selection command for selecting fewer than all the programs from the network input, including the selection of a first program and non-selection of a second program; means for receiving portions of compressed programs from the input data streams into the buffers;

conversion means for reading portions of the compressed programs from the buffers, decoding the portions into uncompressed data, and storing the uncompressed data into the buffers as uncompressed programs depending on the selection, the conversion means convert portions of a first component of a first media and portions of a second component of a different second media of the first program into an uncompressed output program;

means for transmitting the uncompressed portions of programs from the buffers onto the output as an uncompressed, digital, data stream;

means for receiving a change selection command to splice the second program to the first program;

means for selecting a splice-in point of a first component of a first media in the second program depending on the change channel command;

means for selecting a splice-out point of a first component of the first media in the first program, approximately aligned in the stream with the splice-in point of the first component, and with an end-presentation time of the last presented portion after the splice-out equal or previous to the begin-presentation time of the first presented portion of the first component after the splice-in point of the first component;

the converting means splice the first component of the first program out at the selected splice-out point of the first component and splice the first component of the second program in at the selected splice-in point of the first component for converting the first component of the second program and the second component of the first program into the output program; means for selecting a splice-in point in the stream for the second component, at which the begin-presentation time of the earliest presented portion of the second component after the splice-in for the second component is equal or after the end-presentation time of the latest presented portion of the first component before the splice-out point for the first component;

means for selecting a splice-out point in the stream for the second component, which is approximately aligned in the stream with the splice-in point for the second component, and at which the end-presentation time for the latest presented portion of the second component in the first program before the splice-out point for the second component is equal or before the begin-presentation time for the earliest presented portion of both: the first component after the splice-in point of the first component; and the second component after the splice-in point of the second component;

the converting means splice the second component of the first program out at the selected splice-out of the second component and splice g the second component of the second program in at the selected splice-in point of the second component for converting the first and second component of the second program into the output program.

15. A method of operating a multimedia system, comprising:

providing uncompressed multimedia data for two or more programs;

encoding the uncompressed data into one or more multimedia data streams, including a first and second programs, each of the first and second programs including a first media component of the same first media and a second media component of the same second media which is different than the first media, each of the first and second media components of each of the first and second programs having a multitude of splice-in points with begin-presentation times of first portions after the splice-in and splice-out points with end-presentation times of the last portion before the splice-out, which times are relative to their positions in the stream in which they are contained;

receiving a command to splice the second program to the first program;

selecting a splice-in point in the stream for the first component in the second program;

selecting a splice-out point in the stream for the first component in the first program, with a position in the stream aligned or before the position in the stream of the splice-in point of the first component of the second program;

splicing the first component of the first program out at the selected splice-out point for the first component and splicing the first component of the second program in at the selected splice-in point for the first component;

selecting a splice-in point in the stream for the second component in the second program, at which a begin-presentation time of the earliest presented portion of the second component after the splice-in is equal or after the end-presentation time of the latest presented portion of the first component before the splice-out point of the first component;

selecting a splice-out point in the stream for the second component in the first program, at which an end-presentation time of the latest presented portion of the second component before the splice-out point is equal or before the begin-presentation time of both: the earliest presented portion of the first component after the splice-in point for the first component; and the earliest presented portion of the second component after the splice-in point of the second component;

splicing the second component of the first program out at the selected splice-out of the second component and splicing the second component of the second program in at the selected splice-in point of the second component;

decoding the first component of the first program until the splice-out point for the first component; decoding the first component of the second program starting at the splice-in point for the first component; decoding the second component of the first program until the splice-out point for the second component; and decoding the second component of the second program starting at the splice-in point for the second component to provide continuous decompressed data for a program.

16. A multimedia network system, comprising:

means for producing and transmitting uncompressed multimedia data for a multitude of programs including a first and a second program, each of the first and second programs including a first and a second component, the first components of both the first and second programs being the same first type of media and the second components of both the first and second programs being the same second type of media, the first type of media being different than the second type of media;

one or more encoder processing units;

an encoder memory communicating with the encoder processing units, each encoder memory including one or more buffers;

one or more encoder inputs for each encoder processing unit for receiving uncompressed data of programs, the encoder processing units communicating with the buffers of the respective encoder memory;

at least one encoder output for the encoder processing units for a data stream including compressed data for one or more programs, the output communicating with the buffers in the respective encoder memory;

means for receiving the uncompressed program data from the encoder inputs into the buffers of the encoder memory;

means for compressing portions of the uncompressed data of the programs contained in the buffers into corresponding portions of the uncompressed data of the programs in the buffers of the encoder memory;

means for transmitting the compressed data of the programs from the buffers onto the network output of the encoders, in one or more data streams;

splice-out providing means for providing a multitude of seamless splice-out points in at least the first component of the first program;

splice-in providing means for providing a multitude of seamless splice-in points in at least the first of the second program;

a splicer processing unit;

a splicer memory communicating with the splicer processing unit, including one or more buffers;

one or more network inputs communicating with the buffers in the splicer memory, for one or more input data streams including the first and second programs;

at least one network output for an output data stream with one or more programs, communicating with the buffers in the splicer memory;

means for receiving the programs from the input data streams into the buffers of the splicer memory;

means for transmitting the programs from the buffers of the splicer memory onto the network output as a data stream; and means for receiving a splice command to splice the second program to the first program;

means for selecting a splice-in point of the first component in the second program depending on the splice command;

means for selecting a splice-out point of the first component in the first program, which is approximately aligned in the stream with the splice-in point of the first component of the second program, and at which the end-presentation time of the latest presented portion of the first component of the first program after the splice-out is equal or after the begin-presentation time of the earliest presented portion of the first component of the second program after the splice-in point so as to provide a seamless splice;

means for splicing the first component of the first program out at the selected splice-out point of the first component and splicing the first component of the second program in at the selected splice-in point of the first component;

means for selecting a splice-in point for the second component in the second program, at which the begin-presentation time of a earliest presented portion of the second component after the splice-in for the second component is equal or after the end-presentation time of the latest presented portion of the first component before the splice-out point for the first component;

means for selecting a splice-out point for the second component in the first program, at which the end-presentation time for a latest presented portion of the second component after the splice-out for the second component is equal or before the begin-presentation time for both: the earliest presented portion of the first component after the splice-in point of the first component; and the earliest presented portion of the second component after the splice-in point of the second component;

means for splicing the second component of the first program out at the selected splice-out of the second component and splicing the second component of the second program in at the selected splice-in point of the second component;

a decoder processing unit;

a decoder memory communicating with the decoder processing unit, including one or more buffers of the decoder memory;

one or more network inputs communicating with the input buffers in the decoder memory, for one or more input data streams including either the first or second programs and including one or more other programs each including a first media component of the same first media and a second media component of the same second media which is different than the first media, each media component of each program having a multitude of splice-in points and splice-out points associated with at least a relative begin-presentation time;

means for selecting less than all the programs from a multitude of programs in a data stream;

at least one output for uncompressed data of the selected programs, communicating with the memory;

means for receiving portions of the selected programs from the input data streams into buffers;

means to read only portions of selected programs from the buffers, to decode the read portions of the selected programs, and to output uncompressed data into the buffers; and means for transmitting the programs from the buffers onto the output as an uncompressed digital data stream.

17. The encoder of claim 9 in which:

the ending delay at each video seamless splice-out point is at least the period of one video picture less than the startup delay for the program at each video seamless splice-in point so that all the video seamless splice-out points are seamless and all of the video seamless splice-in points are seamless.

* * * * *